US 8,484,893 B2
(12) United States Patent
Hayakawa et al.

(10) Patent No.: US 8,484,893 B2
(45) Date of Patent: Jul. 16, 2013

(54) CLUTCH, MOTOR AND VEHICLE DOOR OPENING/CLOSING DEVICE

(75) Inventors: Natsuto Hayakawa, Kosai (JP); Tomoaki Ozaki, Toyohashi (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 92 days.

(21) Appl. No.: 13/198,742

(22) Filed: Aug. 5, 2011

(65) Prior Publication Data
US 2012/0066975 A1  Mar. 22, 2012

(30) Foreign Application Priority Data

Aug. 5, 2010  (JP) ................................ 2010-176263
Aug. 4, 2011  (JP) ................................ 2011-171181

(51) Int. Cl.
| E05F 15/00 | (2006.01) |
| B60J 5/00 | (2006.01) |
| F16D 7/00 | (2006.01) |
| F16D 23/10 | (2006.01) |

(52) U.S. Cl.
USPC ............ 49/139; 49/360; 296/146.4; 296/155; 192/54.5; 192/105 BB; 192/103 C

(58) Field of Classification Search
USPC ... 49/139, 140, 360; 296/146.4, 155; 192/105 BA, 105 BB, 103 B, 103 C, 54.5, 54.52
See application file for complete search history.

(56) References Cited

U.S. PATENT DOCUMENTS

| 3,367,465 | A | * | 2/1968 | Newman ................ 192/105 BA |
| 3,656,598 | A | * | 4/1972 | Goble .............................. 192/35 |
| 3,977,503 | A | * | 8/1976 | Hurst .............................. 192/21 |
| 4,673,073 | A | * | 6/1987 | Weatherby ...................... 192/35 |
| 5,740,894 | A | * | 4/1998 | Buchanan et al. ........... 192/54.5 |
| 7,448,481 | B2 | * | 11/2008 | Kimes et al. .................. 192/46 |
| 7,780,221 | B2 | * | 8/2010 | Gotou et al. ................ 296/146.4 |
| 7,866,455 | B2 | * | 1/2011 | Gotou et al. .................... 192/38 |
| 2002/0050430 | A1 | * | 5/2002 | Liau ................................ 192/38 |
| 2006/0185957 | A1 | * | 8/2006 | Kimes et al. .................... 192/46 |
| 2007/0283628 | A1 | * | 12/2007 | Gotou et al. .................... 49/360 |
| 2008/0245636 | A1 | * | 10/2008 | Gotou et al. ................. 192/48.3 |

FOREIGN PATENT DOCUMENTS

| JP | 2002-327576 | 11/2002 |
| JP | 2008-133951 | 6/2008 |

* cited by examiner

Primary Examiner — Katherine Mitchell
Assistant Examiner — Scott Denion
(74) Attorney, Agent, or Firm — Caesar, Rivise, Bernstein, Cohen & Pokotilow, Ltd.

(57) ABSTRACT

A clutch includes a driving-side rotating body, a driven-side rotating body, a holding case, and a power transmitting member held by one of the driving-side rotating body and the holding case. The power transmitting member is moved between a non-engaging position and an engaging position where the driving-side rotating body engages with the driven-side rotating body. The clutch further includes a guiding member held by the other of the driving-side rotating body and the holding case. The guiding member has a cam portion engaged with the power transmitting member and guides movement of the power transmitting member between the engaging position and the non-engaging position. Relative rotation between the driving-side rotating body and the holding case occurs, resulting in that the power transmitting member is guided by the cam portion to move from the non-engaging position to the engaging position.

12 Claims, 14 Drawing Sheets

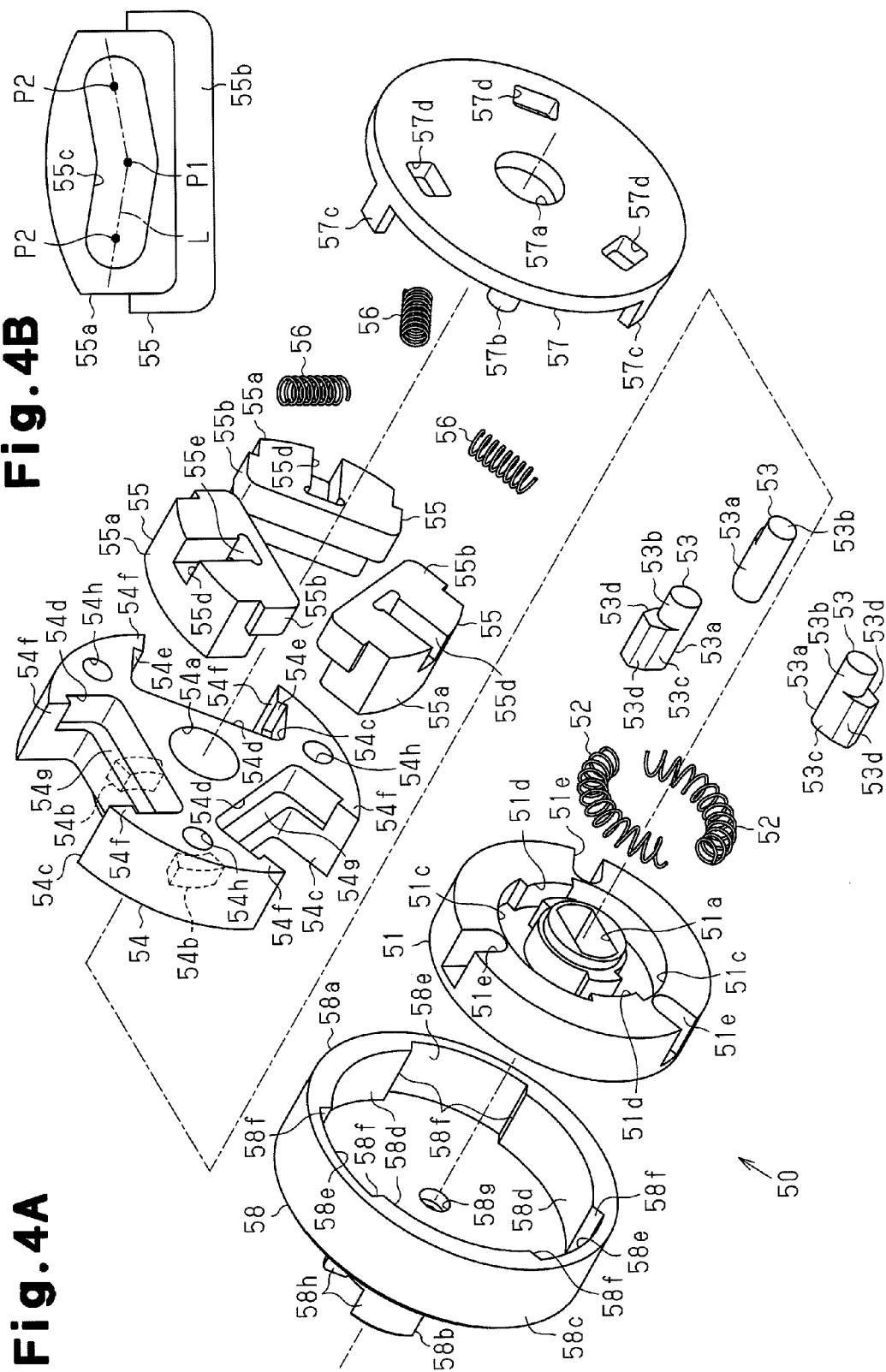

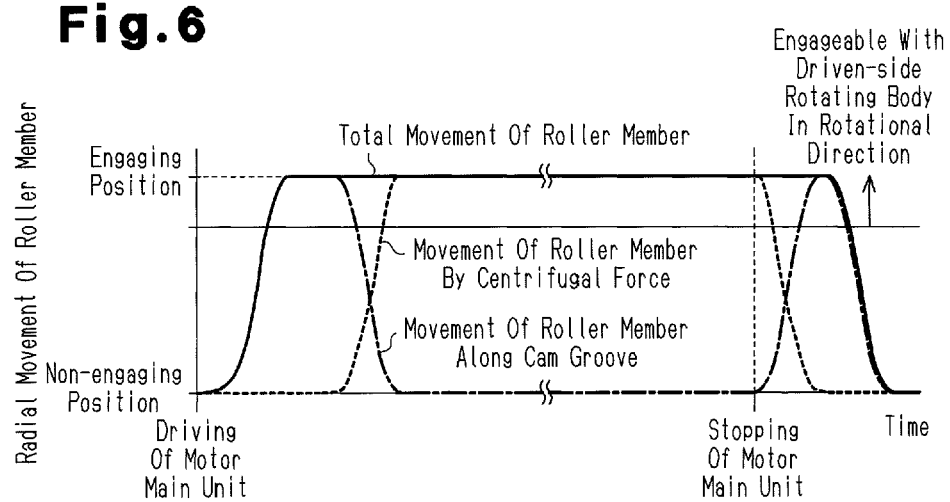
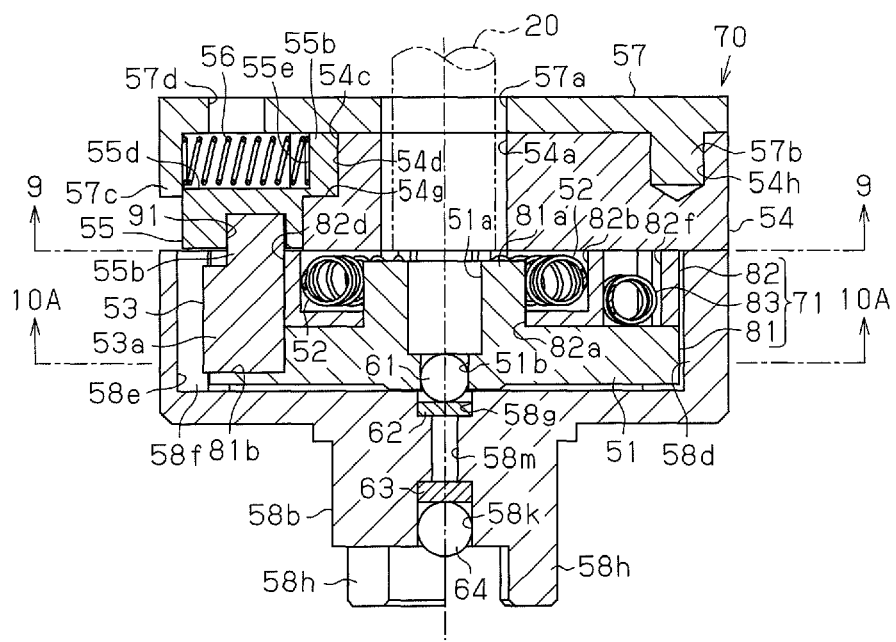

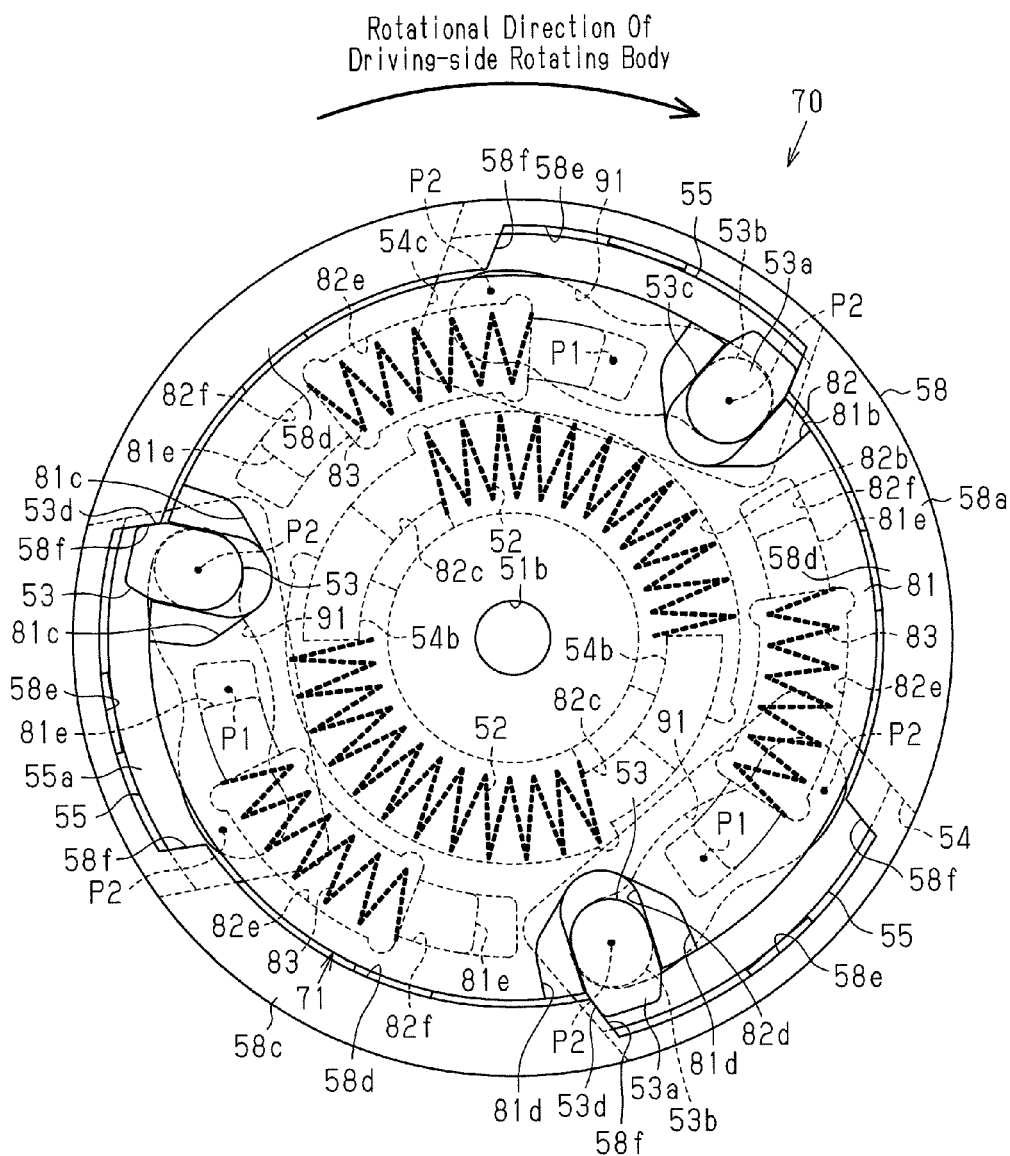

CLUTCH, MOTOR AND VEHICLE DOOR OPENING/CLOSING DEVICE

BACKGROUND OF THE INVENTION

The present invention relates to a mechanical clutch provided in a motor or the like as a drive source for a vehicle door opening/closing device to perform coupling and uncoupling between a drive shaft and a driven shaft, a motor equipped with the clutch and a vehicle door opening/closing device equipped with the motor having the clutch.

In recent years, some vehicles equipped with a slide door that opens and closes a gate provided on a side of a vehicle body have been provided with a vehicle door opening/closing device for automatically opening and closing the slide door by drive force from a motor. This vehicle door opening/closing device also needs to be able to manually open and close the slide door. For example, a vehicle door opening/closing device described in Japanese Laid-Open Patent Publication No. 2002-327576 includes, in the motor as the drive source, an electromagnetic clutch that can open and close the door automatically and manually. When being turned on, the electromagnetic clutch couples the motor to the door to enable automatic opening/closing of the door, and when being turned off, the electromagnetic clutch cancels coupling between the door and the motor to enable manual opening/closing of the door.

However, the use of the electromagnetic clutch leads to complicated wiring for power supply within the motor. For this reason, for example, as described in Japanese Laid-Open Patent Publication No. 2008-133951, it is desired to replace the electromagnetic clutch with a mechanical clutch.

Such a mechanical clutch includes a driving coupling portion that can rotate integrally with a drive shaft of a motor main unit, an intermediate plate held via a spring at a predetermined relative rotational position relative to the driving coupling portion, and a driven cylindrical portion that can rotate integrally with a driven shaft coupled to the door. A roller member is arranged between the driving coupling portion and the intermediate plate, and the driven cylindrical portion in the radial direction of the clutch. During stopping of the motor main unit, the roller member is arranged at a radial inward position, that is, a non-pinching position where the roller member is not engaged with the intermediate plate and the driven cylindrical portion in the rotational direction, so that the drive shaft is uncoupled from the driven shaft. For this reason, even when the driven cylindrical portion rotates, the rotation is not transmitted to the intermediate plate not to rotate the drive shaft. Thus, the door can be easily opened/closed by hand. On the other hand, during driving of the motor main unit, as the intermediate plate rotates with rotation of the driving coupling portion, the roller member revolves. The roller member is moved radially outward by the centrifugal force generated during revolution and is arranged at a pinching position where the roller member is pinched by the intermediate plate and the driven cylindrical portion. At this time, since the intermediate plate is engaged with the driven cylindrical portion in the rotational direction via the roller member, rotation of the intermediate plate allows the driven cylindrical portion to be rotated. As a result, the driven shaft rotates and the slide door coupled to the driven shaft is automatically opened/closed.

However, in the clutch described in Japanese Laid-Open Patent No. 2008-133951, when the centrifugal force occurring at the roller member during driving of the motor main unit is too strong, the roller member moving radially outward may strike against the driven cylindrical portion, be returned to the radially inner side by the striking to the driven cylindrical portion and then, strike against the driving coupling portion and the intermediate plate. Until the driving coupling portion is coupled to the driven cylindrical portion via the roller member, that is, until the clutch is turned on, the striking may be repeated multiple times. Disadvantageously, the repeated striking between the driven cylindrical portion and the roller member, and the repeated striking between the driving coupling portion and the intermediate plate, and the roller member cause noise.

SUMMARY OF THE INVENTION

An objective of the present invention is to provide a clutch capable of improving the reliability of operation in turning on the clutch, and a motor and a vehicle door opening/closing device that are provided with the clutch.

To achieve the foregoing objective and in accordance with one aspect of the present invention, a clutch for provision between a drive shaft and a driven shaft is provided to operate to couple the drive shaft to the driven shaft when a drive force is transmitted from the drive shaft and uncouple the driven shaft from the drive shaft during non-driving of the drive shaft. The clutch includes a driving-side rotating body capable of rotating integrally with the drive shaft, a driven-side rotating body capable of rotating integrally with the driven shaft, a holding case capable of rotating relative to the driving-side rotating body, and a power transmitting member that is held by one of the driving-side rotating body and the holding case so as to be rotatable integrally with the one of the driving-side rotating body and the holding case. The power transmitting member is arranged between the driving-side rotating body and the driven-side rotating body in the radial direction and is moved between a non-engaging position, where the driving-side rotating body does not engage with the driven-side rotating body in a rotational direction, and an engaging position located radially outward from the non-engaging position, where the driving-side rotating body engages with the driven-side rotating body in the rotational direction. The clutch further includes a guiding member having a cam portion that is engaged with the power transmitting member and guides movement of the power transmitting member between the engaging position and the non-engaging position. The guiding member is held by the other of the driving-side rotating body and the holding case so as to be rotatable integrally with the other of the driving-side rotating body and the holding case. At start of rotational driving of the driving-side rotating body, relative rotation between the driving-side rotating body and the holding case occurs, resulting in that the power transmitting member is guided by the cam portion to move from the non-engaging position to the engaging position.

BRIEF DESCRIPTION OF THE DRAWINGS

The invention, together with objects and advantages thereof, may best be understood by reference to the following description of the presently preferred embodiments together with the accompanying drawings in which:

FIG. 4A is an exploded perspective view showing the clutch in FIG. 3;

FIG. 4B is a front view showing a guiding member in the clutch in FIG. 3;

FIG. 6 is a diagram for describing movement of a roller member in a radial direction of the clutch;

FIG. 7 is a sectional view showing a clutch in accordance with a second embodiment;

FIGS. 10B to 10D each are a sectional view showing operation of the clutch in FIG. 10A.

DETAILED DESCRIPTION OF THE PREFERRED EMBODIMENTS

First Embodiment

Figure 1:
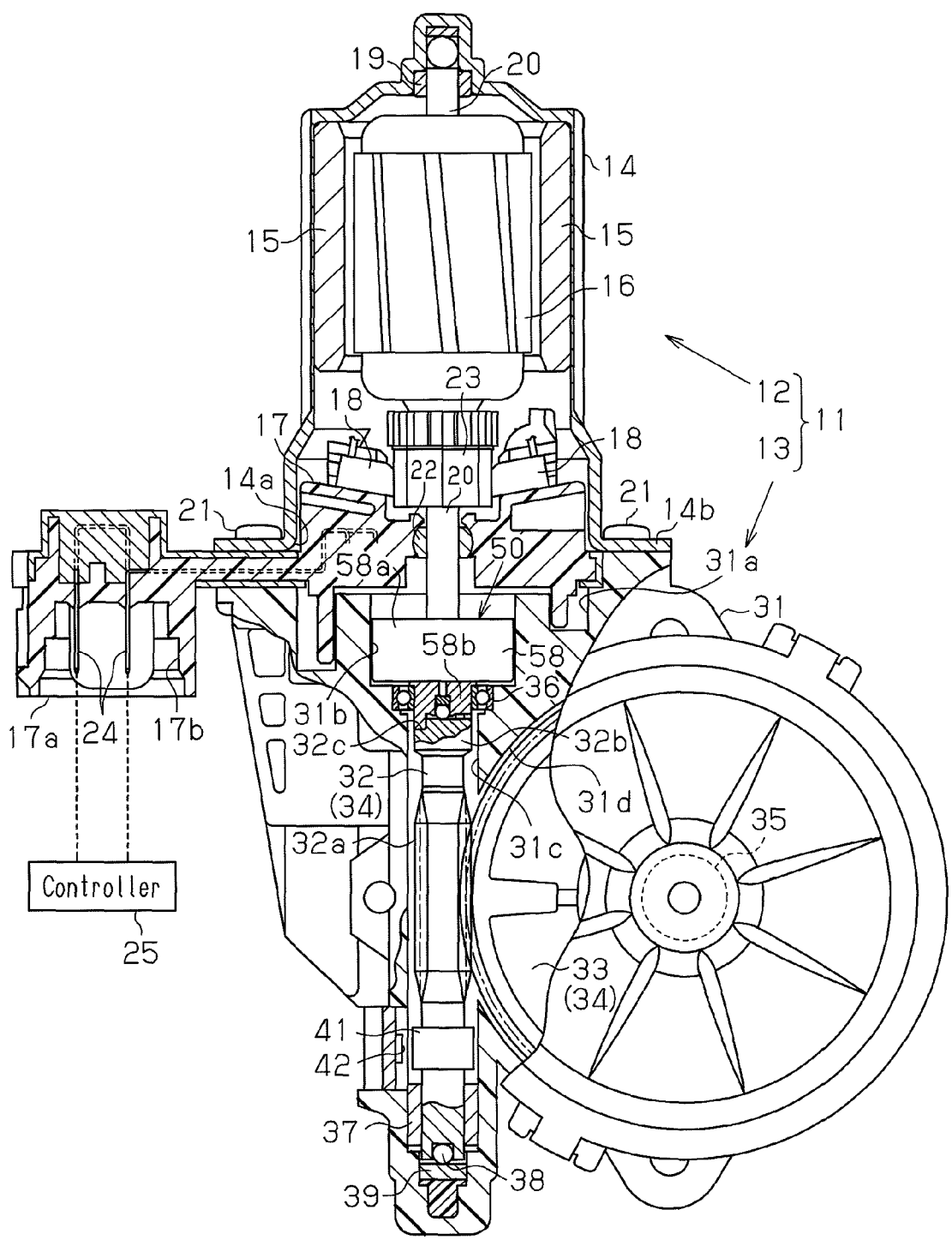
FIG. 1 is a sectional view showing a motor with a clutch in accordance with a first embodiment of the present invention.
Figure 2:
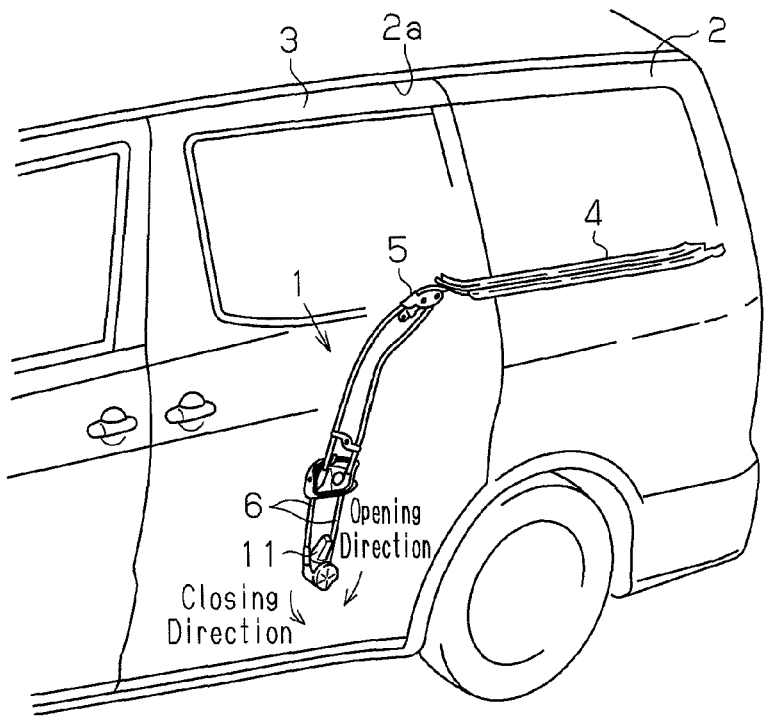
FIG. 2 is a schematic view showing a vehicle slide door opening/closing device equipped with the motor with the clutch in FIG. 1.

A first embodiment in accordance with the present invention will be described below with reference to the drawings. FIG. 1 shows a motor 11 in this embodiment. As shown in FIG. 2, the motor 11 is used as a drive source for a slide door opening/closing device 1 mounted to a vehicle. The slide door opening/closing device 1 (vehicle door opening/closing device) is arranged in a slide door 3. The slide door 3 (door) is arranged so as to be slidably openable/closable along a side surface of a vehicle body 2 (vehicle) and is supported by a coupling tool 5 coupled to a guide rail 4 provided on the vehicle body 2. When the motor 11 is driven to reel or feed a wire cable 6, the coupling tool 5 moves along the guide rail 4. The movement of the coupling tool 5 moves the slide door 3, thereby opening/closing a gate 2a formed on the vehicle body 2.

As shown in FIG. 1, the motor 11 is a geared motor configured as a motor main unit 12 and a decelerating portion 13. The motor main unit 12 includes a yoke housing 14, a pair of magnets 15, an armature 16, a brush holder 17 and a pair of brushes 18.

The yoke housing 14 is shaped like a cylinder having a bottom and includes the pair of magnets 15 fixedly attached to its inner circumference. The armature 16 is arranged in the yoke housing 14 and a bearing 19 is provided at the center of the bottom of the yoke housing 14. The bearing 19 rotatably supports a proximal end of a rotary shaft 20 (drive shaft) of the armature 16.

The yoke housing 14 includes an open end having an opening portion 14a, and a flange portion 14b extending radially outward, which is formed on the open end. The flange portion 14b is fixedly connected to a gear housing 31 of the decelerating portion 13 described later. The flange portion 14b is fixed to the gear housing 31 by means of a screw 21.

In the yoke housing 14, the brush holder 17 holds a bearing 22 that axially supports a distal end portion of the rotary shaft 20 and the pair of brushes 18 that slidingly contact a rectifier 23 fixedly attached to the rotary shaft 20. The brush holder 17 has a connector portion 17a that protrude from the yoke housing 14 and the gear housing 31, and a vehicle-side connector (not shown) extending from the side of the vehicle body is connected to the connector portion 17a. Plural terminals 24 are exposed in a connecting recess 17b of the connector portion 17a. These terminals 24 are inserted into the brush holder 17 and electrically connected to a rotational sensor (Hall element 42 described later) and the brushes 18 in the motor 11. When the vehicle-side connector is connected to the connector portion 17a, a controller 25 provided on the side of the vehicle body is electrically connected to the motor 11. Thereby, it becomes possible to supply power and output a sensor signal between the motor 11 and the controller 25.

The decelerating portion 13 includes the gear housing 31, a decelerating mechanism 34 formed of a worm shaft 32 (driven shaft) and a worm wheel 33, an output shaft 35 and a clutch 50.

The resin gear housing 31 includes an open end having an opening portion 31a and the open ends of both the housings 31 and 14 are opposite to and bonded to each other so that the opening portions 31a and 14a of both the housings 31 and 14 form one space. The brush holder 17 is arranged in the space formed by both the opening portions 14a and 31a. The gear housing 31 includes a clutch storing portion 31b further extending from the opening portion 31a in the axial direction of the worm shaft 32. The gear housing 31 further includes a substantially cylindrical shaft storing cylindrical portion 31c that extends from the bottom of the clutch storing portion 31b in the axial direction of the worm shaft 32 and stores the worm shaft 32, and a substantially circular wheel storing portion 31d that is connected to the shaft storing cylindrical portion 31c and stores the worm wheel 33.

Bearings 36 and 37 are axially arranged at both ends of the shaft storing cylindrical portion 31c, respectively. The worm shaft 32 is arranged in the shaft storing cylindrical portion 31c, with a distal end of the worm shaft 32 being axially supported by the bearing 37, so as to be coaxial with the rotary shaft 20 (that is, central axes of the rotary shaft 20 and the worm shaft 32 match with each other). A worm portion 32a in the form of a screw tooth is axially formed substantially at the center of the worm shaft 32. A thrust receiving ball 38 and a thrust receiving plate 39 that receive a thrust load of the worm shaft 32 are arranged at an end of the shaft storing cylindrical portion 31c, which corresponds to the distal end of the worm shaft 32.

A ring-like sensor magnet 41 multipolar-magnetized in the circumferential direction is attached between the worm portion 32a and a site supported by the bearing 37 in the worm shaft 32 so as to rotate integrally with the worm shaft 32. The Hall element 42 that detects change in magnetic field due to the rotation of the sensor magnet 41 is arranged at a site opposite to an outer circumferential surface of the sensor magnet 41 in the shaft storing cylindrical portion 31c. The Hall element 42 outputs a signal for detecting rotational information of the worm shaft 32 such as the number of revolutions and rotational speed, which is a rotation detecting signal corresponding to change in magnetic field due to the rotation of the sensor magnet 41. The controller 25 detects the opening/closing position and opening/closing speed of the slide door 3 according to the rotation detecting signal.

The disc-like worm wheel 33 engaged with the worm portion 32a of the worm shaft 32 is rotatably stored in the wheel storing portion 31d. The output shaft 35 is fixed to the radial center of the worm wheel 33 so as to rotate integrally with the worm wheel 33. A drive pulley (not shown) from which the wire cable 6 for opening and closing the slide door 3 (refer to FIG. 2) is hung is coupled to the output shaft 35 so as to rotate integrally with the output shaft 35.

The clutch storing portion 31b stores the mechanical clutch 50 that is arranged between the worm shaft 32 and the rotary shaft 20 to perform coupling and uncoupling between the worm shaft 32 and the rotary shaft 20. As shown in FIG. 4A, the mechanical clutch 50 includes a driving-side rotating body 51, two case holding springs 52 (case holding biasing member), three roller members 53 (power transmitting member), a holding case 54, three guiding members 55, three holding springs 56 (holding biasing member), a cover 57 and a driven-side rotating body 58.

Figure 3:
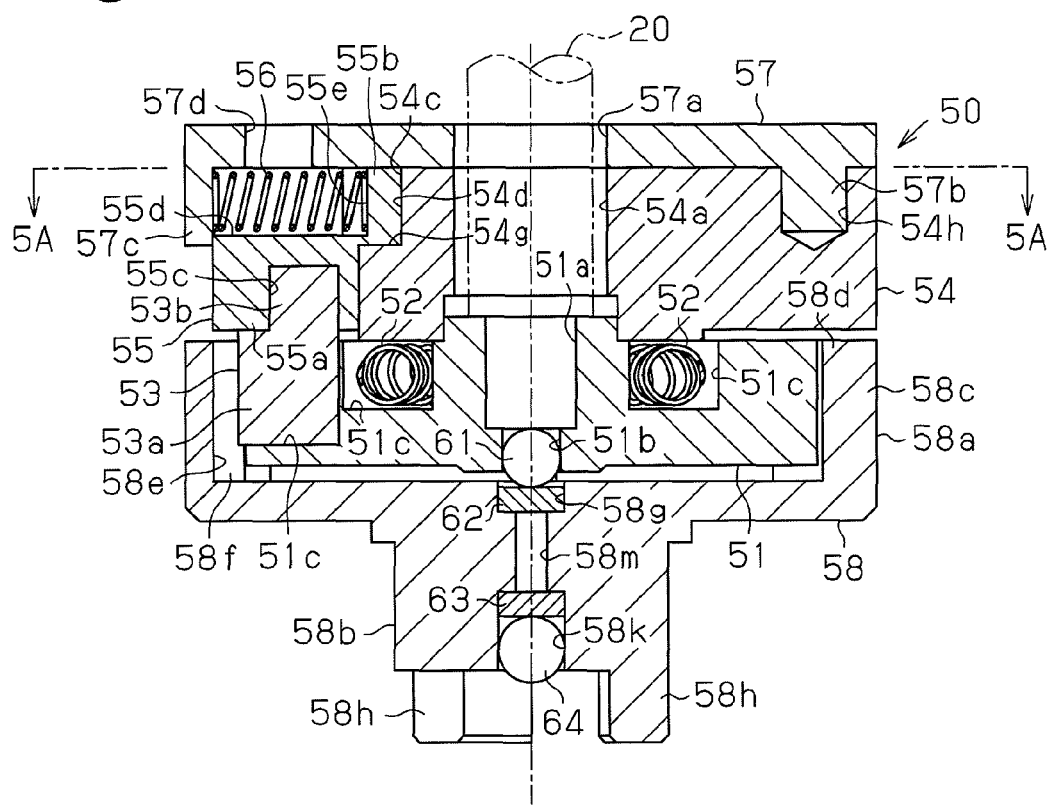
FIG. 3 is a sectional view showing the clutch of the motor in FIG. 1.

The driving-side rotating body 51 is shaped like a disc and has a smaller outer diameter than the inner diameter of the clutch storing portion 31b (refer to FIG. 1). A shaft coupling recess 51a is formed at the radial center of the driving-side rotating body 51. The shaft coupling recess 51a extends along the axial direction of the driving-side rotating body 51 (that is, the axial direction of the clutch 50) so as to be opened on the end surface of the driving-side rotating body 51 opposite to the holding case 54. The shaft coupling recess 51a has a pair of flat surface portions that are parallel to each other when viewed from the axial direction. A distal end of the rotary shaft 20 shaped so as to match with the shaft coupling recess 51a, as shown in FIG. 3, is inserted into the shaft coupling recess 51a, so that the driving-side rotating body 51 is engaged with the rotary shaft 20 so as to rotate integrally with the rotary shaft 20. The rotary shaft 20 and the driving-side rotating body 51 are coaxially coupled to each other. Further, a ball storing hole 51b is formed on the bottom of the shaft coupling recess 51a. A spherical thrust receiving ball 61 for receiving a thrust load from the rotary shaft 20 and the driven-side rotating body 58 is stored in the ball storing hole 51b.

As shown in FIG. 4A, a pair of spring storing portions 51c are formed on the radially outer side of the shaft coupling recess 51a of the driving-side rotating body 51. The two spring storing portions 51c are opened on the end surface of the driving-side rotating body 51 opposite to the holding case 54. Further, the two spring storing portions 51c are each shaped like an arcuate groove surrounding the shaft coupling recess 51a and are symmetrical about the shaft coupling recess 51a. These spring storing portions 51c each store the case holding spring 52 formed of a compression coil spring.

In the driving-side rotating body 51, engaging recesses 51d are formed at places between adjacent ends of the two spring storing portions 51c in the circumferential direction, that is, at two places spaced apart by 180 degrees in the circumferential direction, respectively. Each of the engaging recesses 51d is opened on the end surface of the driving-side rotating body 51 opposite to the holding case 54 and is shaped like an arc having the central axis of the driving-side rotating body 51 as the center of curvature. Furthermore, the engaging recesses 51d each are formed concentric with the spring storing portions 51c and have a smaller radial width than that of the spring storing portions 51c. Further, each of the engaging recesses 51d communicates the two adjacent spring storing portions 51c in the circumferential direction to each other.

Three control grooves 51e are formed on the outer periphery of the driving-side rotating body 51. The three control grooves 51e are formed at three places at regular angular intervals (in this embodiment, at intervals of 120 degrees) in the circumferential direction in the driving-side rotating body 51. Each of the control grooves 51e is formed radially inward from the outer periphery of the driving-side rotating body 51, thereby being opened to the outside in the radial direction. Each of the control grooves 51e is opened only toward the holding case 54 in the axial direction and is U-shaped and opened to the outside in the radial direction when viewed from the axial direction.

Each of the roller members 53 includes a power transmitting portion 53a and a cam engaging portion 53b formed integrally with the power transmitting portion 53a. The power transmitting portion 53a is pole-like and has a longitudinal direction and a transverse direction in a cross section orthogonal to its axial direction. When viewed from the axial direction, a first end in the longitudinal direction (radially inner end of the clutch 50) is U-shaped and a second end in the longitudinal direction (radially outer end of the clutch 50) is shaped like a trapezoid that becomes narrower toward the distal end of the second end. A pair of guiding surfaces 53c that are parallel to each other are formed on both side surfaces of the power transmitting portion 53a in the transverse direction (in the substantially circumferential direction of the clutch 50). Each of the guiding surfaces 53c is a flat surface in parallel to the axial direction of the clutch 50. Further, a pair of contact surfaces 53d are formed on the radially outer side from the guiding surfaces 53c (radially outer side of the clutch 50), on both side surfaces of the power transmitting portion 53a in the transverse direction. When viewed from the axial direction, the pair of contact surfaces 53d are inclined relative to the longitudinal direction of the power transmitting portions 53a so as to become closer to each other toward a distal end of the second end of the power transmitting portions 53a. Each of the contact surfaces 53d is a flat surface in parallel to the axial direction of the clutch 50. Further, as shown in FIG. 3, the power transmitting portions 53a each have the substantially the same length in the axial direction as the axial width of the control groove 51e formed on the driving-side rotating body 51. Furthermore, as shown in FIG. 4A, when viewed from the axial direction, the power transmitting portions 53a each have the almost same length in the longitudinal direction as the radial length of the control grooves 51e, and have the almost same length in the transverse direction (that is, length between the guiding surfaces 53c) as the circumferential width of the control grooves 51e.

The cam engaging portion 53b axially extends from one end surface of the power transmitting portion 53a in the axial direction and is columnar. When viewed from the axial direction, the cam engaging portion 53b protrudes from one end (end on the radially inner side of the clutch 50) of the power transmitting portion 53a in the longitudinal direction. Furthermore, the diameter of the cam engaging portion 53b is equal to the length of the power transmitting portion 53a in the transverse direction (that is, length between the guiding surfaces 53c).

Figure 5A:
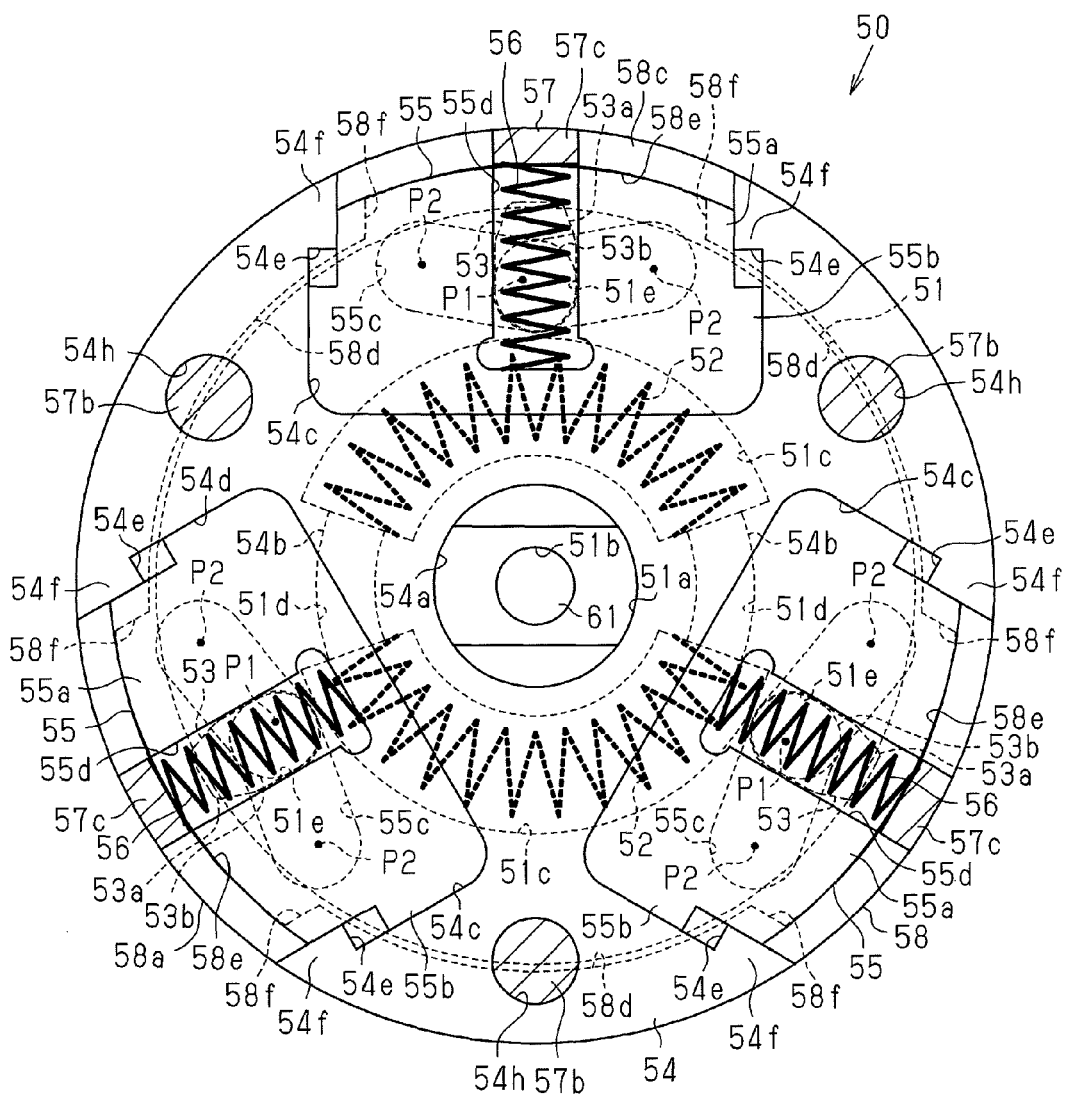
FIG. 5A is a sectional view showing the clutch along line 5A-5A in FIG. 3.
Figure 5B:
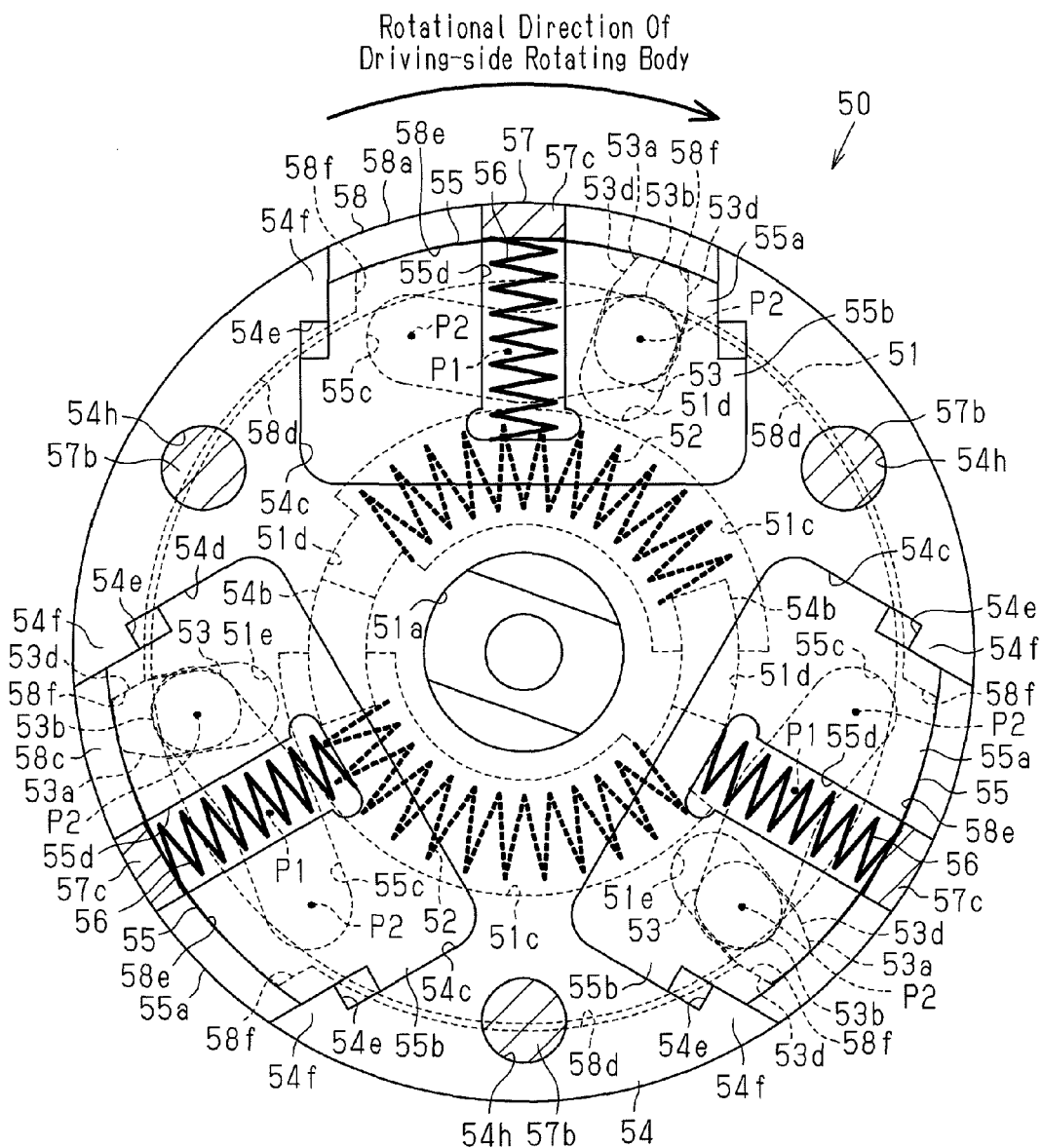
FIGS. 5B to 5D each are a sectional view showing operation of the clutch in FIG. 5A.

As shown in FIG. 3, in the three roller members 53 (FIG. 3 shows only one of the three roller members 53), the power transmitting portions 53a are stored in the three control grooves 51e of the driving-side rotating body 51, respectively, and the cam engaging portions 53b axially protrude further toward the holding case 54 than the driving-side rotating body 51. As shown in FIGS. 5A and 5B, when viewed from the axial direction, the power transmitting portions 53a are inserted into the control grooves 51e so that the longitudinal direction matches with the radial direction of the driving-side rotating body 51 and the transverse direction substantially matches with the peripheral direction of the driving-side rotating body 51. The roller members 53 can move in the radial direction of the driving-side rotating body 51 while sliding the guiding surfaces 53c against inner peripheries of the control grooves 51e. For this reason, the control grooves 51e guide movement of the roller members 53 in the radial direction of the driving-side rotating body 51 and restrict movement of the roller members 53 in the peripheral direction of the driving-side rotating body 51.

As shown in FIGS. 3 and 4A, the holding case 54 is substantially shaped like a disc having a larger outer diameter than that of the driving-side rotating body 51. A through hole 54a axially penetrating the holding case 54 is formed at the radial center of the holding case 54. The through hole 54a is circular when viewed from the axial direction and its inner diameter is slightly larger than the outer diameter of the rotary shaft 20. The holding case 54 is axially overlapped on the driving-side rotating body 51 in the state where the rotary shaft 20 is inserted into the through hole 54a. The holding case 54 and the driving-side rotating body 51 are coaxially arranged (their central axes match with each other, see the line formed by a long dash alternating with one short dash in FIG. 3).

A pair of axially protruding engaging projections 54b are formed at two places spaced apart by 180 degrees on the outer circumference of the through hole 54a on the end surface of the holding case 54 axially opposite to the driving-side rotating body 51. The engaging projections 54b are formed so as to correspond to the pair of engaging recesses 51d formed on the driving-side rotating body 51, respectively. That is, each of the engaging projections 54b is shaped like an arc when viewed from the axial direction, and its radial width is equal to that of the engaging recess 51d and its circumferential width is equal to that of the engaging recess 51d. The pair of engaging projections 54b are inserted into the pair of engaging recess 51d, respectively. As shown in FIG. 5A, the engaging projections 54b inserted into the engaging recesses 51d are each arranged between ends of the two case holding springs 52. By coupling the holding case 54 to the driving-side rotating body 51 via these case holding springs 52 in the rotational direction and biasing the engaging projections 54b by means of the case holding springs 52, the holding case 54 is held at a predetermined relative rotational position relative to the driving-side rotating body 51.

As shown in FIG. 4A, holding recesses 54c are formed at three places at regular angular intervals (in this embodiment, at intervals of 120 degrees) on the holding case 54 in the circumferential direction. Each of the holding recesses 54c is provided so as to radially protrude from the outer periphery of the holding case 54 to the inside in the radial direction. Each of the holding recesses 54c axially penetrates the holding case 54 and is opened to the outside in the radial direction. A restricting recess 54d is formed on a surface (inner surface) defining each of the holding recesses 54c. The restricting recess 54d is formed on the periphery of the holding recess 54c from the opposite side to the driving-side rotating body 51 (that is, from the side of the cover 57) substantially up to the axial center of the holding case 54 in the axial direction. The restricting recess 54d does not extend up to an opening on the radially outer side of the holding recess 54c in the radial direction. That is, the restricting recess 54d is formed only on the radially inner side from the outer periphery of the holding case 54. For this reason, a pair of restricting projections 54f each having a radial restricting surface 54e oriented toward the radially inner side is formed on the openings on the radially outer side of the holding recesses 54c. Further, by forming the restricting recess 54d, an axial restricting surface 54g that faces the opposite side to the driving-side rotating body 51 and is orthogonal to the axial direction is formed in the holding recesses 54c.

Furthermore, assembling holes 54h are formed at places between adjacent holding recesses 54c of the holding case 54 in the circumferential direction, that is, at three places at regular angular intervals (intervals of 120 degrees) in the circumferential direction. Each of the assembling holes 54h has an opening on the end surface of the holding case 54 on the opposite side to the driving-side rotating body 51 in the axial direction and is formed to be axially recessed. Further, the inner circumference of each of the assembling holes 54h is cylindrical.

The guiding member 55 is arranged in each of the three holding recesses 54c formed on the holding case 54. The guiding members 55 in this embodiment each are a weight having a mass for applying the inertial force to the holding case 54. The axial thickness of the guiding members 55 (that is, thickness in the axial direction of the clutch 50) is substantially equal to that of the holding case 54. The guiding members 55 each have a main body 55a substantially in the form of a rectangular parallelepiped and a protruding portion 55b protruding from the main body 55a.

The protruding portions 55b each protrude radially inward from the main body 55a and toward both sides in the circumferential direction. The width of the protruding portions 55b in the axial direction of the clutch 50 is equal to that of the restricting recess 54d. Further, an end surface of the protruding portion 55b opposite to the cover 57 and an end surface of the main body 55a opposite to the cover 57 are located in the same plane. Furthermore, in the radial direction of the clutch 50, the length of the protruding portion 55b protruding from both sides of the main body 55a in the circumferential direction is shorter than that of the restricting recess 54d. For this reason, in the state where the guiding members 55 are arranged in the respective holding recesses 54c so that the protruding portions 55b are arranged in the respective restricting recesses 54d, the guiding members 55 are guided to inner surfaces of the holding recesses 54c and can radially move by a difference between the radial length of the protruding portions 55b and that of the restricting recesses 54d. The guiding members 55 moved radially outward are restricted from further moving radially outward due to contact of the protruding portions 55b against the radial restricting surfaces 54e of the restricting projections 54f. When the guiding members 55 are located radially outermost in the movement range (that is, the protruding portions 55b contact with the radial restricting surfaces 54e), radially outer side surfaces of the main bodies 55a are each shaped like an arc having the radial center of the clutch 50 as the center of curvature. Further, by bringing the protruding portions 55b into contact with the axial restricting surfaces 54g in the axial direction of the clutch 50, the guiding members 55 perform positioning relative to the holding case 54 in the axial direction.

Further, a cam groove 55c is formed on the main body 55a of each of the guiding members 55 so as to be open toward the driving-side rotating body 51. As shown in FIG. 3, the cam groove 55c is axially formed on an end surface of the main body 55a on the side of the driving-side rotating body 51. As shown in FIGS. 4B and 5A, the cam grooves 55c are each a groove extending substantially in the circumferential direction of the holding case 54. Furthermore, the cam grooves 55c extend radially outward from its center in the circumferential direction (substantially in the longitudinal direction of the cam groove 55c) toward its both ends. Further, the circumferential width of the cam grooves 55c (width in the transverse direction) is substantially equal to the diameter of the cam engaging portions 53b of the roller members 53. In each of the cam grooves 55c, the center in the circumferential direction (longitudinal direction) is referred to as a first guiding portion P1 and both ends in the circumferential direction (longitudinal direction) are referred to as a second guiding portion P2. In the state where each of the guiding members 55 is held by the holding case 54, the first guiding portion P1 is located radially innermost in the cam groove 55c, while the second guiding portion P2 are located radially outermost in the cam groove 55c.

As shown in FIG. 4B, since each of the cam grooves 55c in this embodiment linearly extends from the first guiding portion P1 to each of the second guiding portions P2, it is V-shaped to be opened to the outside in the radial direction when viewed from the axial direction. A center line L of the cam groove 55c in the longitudinal direction is V-shaped to be opened to the outside in the radial direction when viewed from the axial direction.

As described above, the guiding members 55 are arranged in the three holding recesses 54c of the holding case 54, respectively, and the roller members 53 are arranged in the three control grooves 51e of the driving-side rotating body 51, respectively. At this time, as shown in FIG. 3, the cam engaging portions 53b of the roller members 53 are inserted into the cam grooves 55c. By inserting the cam engaging portions 53b into the cam grooves 55c, the roller members 53 engage with the cam grooves 55c, resulting in that movement along the longitudinal direction of the cam grooves 55c relative to the guiding member 55 is guided and movement along the cam groove 55c in the width direction (direction orthogonal to the longitudinal direction) is restricted As shown in FIGS. 5A and 5B, when the holding case 54 holding the guiding members 55 and the driving-side rotating body 51 rotate about their central axes relative to each other, the roller members 53 (cam engaging portions 53b) and the guiding members 55 (cam grooves 55c) rotate relatively each other. Each of the roller members 53 is moved in the radial direction of the driving-side rotating body 51 by means of the cam mechanism formed of the cam groove 55c and the cam engaging portion 53b, according to the position of the guiding member 55 in the radial direction while being guided by the control groove 51e.

As shown in FIG. 5A, in the case where the cam engaging portions 53b are arranged at the first guiding portion P1 of the cam grooves 55c by relative rotation of the driving-side rotating body 51 and the holding case 54, and the guiding members 55 are located radially innermost in the holding recesses 54c, the power transmitting portions 53a are arranged radially innermost in the radial movement range. The arrangement position of the roller members 53 at this time correspond to a non-engaging position where the driving-side rotating body 51 does not engage with the driven-side rotating body 58 in the rotational direction. The relative rotational position between the driving-side rotating body 51 and the holding case 54 at the time when the roller members 53 are arranged at the non-engaging position is defined as a neutral position. The case holding springs 52 bias the holding case 54 (engaging projections 54b) so as to keep the driving-side rotating body 51 and the holding case 54 at the neutral position.

Figure 5C:
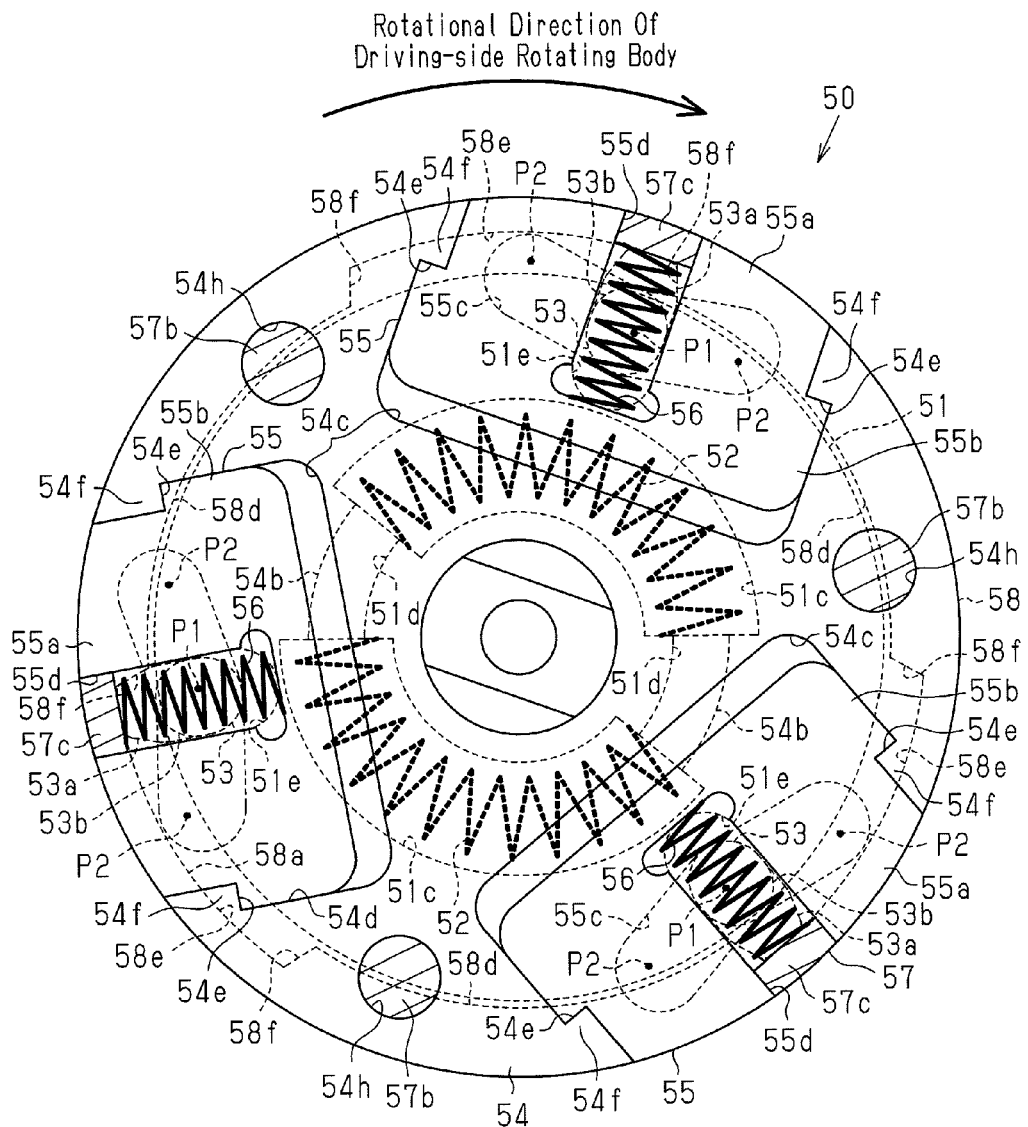

On the other hand, as shown in FIG. 5B, when the cam engaging portions 53b are arranged at the second guiding portion P2 of the cam grooves 55c by relative rotation of the driving-side rotating body 51 and the holding case 54, the power transmitting portions 53a are arranged radially outermost in the radial movement range. At this time, a part of each the power transmitting portion 53a protrudes outward further in the radial direction than the outer periphery of the driving-side rotating body 51. The arrangement position of the roller members 53 at this time corresponds to an engaging position where the driving-side rotating body 51 engages with the driven-side rotating body 58 described later, in the rotational direction. Further, as shown in FIG. 5C, when the roller members 53 are arranged at the engaging position and then, the driving-side rotating body 51 and the holding case 54 rotate relative to each other while the guiding members 55 are moved radially outward by a centrifugal force, the guiding members 55 rotate in the circumferential direction of the holding case 54 with respect to the roller members 53. At this time, although the cam engaging portions 53b move from the second guiding portion P2 to the first guiding portion P1, since the cam grooves 55c move radially outward with the outward radial movement of the guiding members 55, the roller members 53 are maintained at the engaging position.

As shown in FIG. 4A, a spring storing recess 55d is formed at an axial end of each of the guiding members 55 on the side of the cover 57 so as to be opened to one axial side (side of the cover 57) and the radially outer side. The spring storing recess 55d is formed at the circumferential center of each of the guiding members 55. Further, a pressing surface 55e that is shaped like a flat surface orthogonal to the radial direction and oriented radially outward is formed on a radial inner end of the spring storing recess 55d. Each of the holding springs 56 as compression coil springs is stored in the spring storing recess 55d of each of the guiding members 55, and an end of the holding spring 56 (end on the inner side in the radial direction) is in contact with the pressing surface 55e.

The cover 57 is shaped like a disc and has the same outer diameter as the holding case 54. Further, a through hole 57a for penetrating the rotary shaft 20 thereinto is formed at the radial center of the cover 57. Columnar assembling projections 57b axially protruding are formed at regular angular intervals (in this embodiment, at intervals of 120 degrees) at three places on an end surface of the cover 57 in the circumferential direction on the side of the holding case 54. The diameter of the three assembling projections 57b is substantially equal to the inner diameter of the assembling holes 54h so that the assembling projections 57b correspond to the three assembling holes 54h formed on the holding case 54. As shown in FIG. 3, the cover 57 is overlappingly assembled to the holding case 54 so that the three assembling projections 57b are inserted into the three assembling holes 54h, respectively. FIG. 3 shows only one of the assembling holes 54h and only one of the assembling projections 57b. The cover 57 assembled to the holding case 54 is arranged coaxially with the holding case 54 (that is, their central axes match with each other, see a line formed by a long dash alternating with one short dash in FIG. 3). By inserting the assembling projections 57b into the assembling holes 54h, the cover 57 can rotate integrally with the holding case 54.

Further, as shown in FIG. 4A, three pressing portions 57c are formed on the end surface of the cover 57 on the side of the holding case 54. The three pressing portions 57c axially protrude from three places on the outer periphery of the cover 57 at regular angular intervals (at intervals of 120 degrees) in the circumferential direction toward the holding case 54, and are each shaped like a rectangular parallelepiped. Further, since each of the pressing portions 57c is formed at the center between the adjacent assembling projections 57b of the cover 57, the pressing portions 57c and the assembling projections 57b are alternately arranged in the circumferential direction. In the state where the cover 57 is assembled to the holding case 54, the pressing portions 57c are arranged on the radially outer side of the spring storing recesses 55d of the guiding members 55 held by the holding case 54. Each of the holding springs 56 in the spring storing recess 55d is arranged between the pressing portion 57c and the pressing surface 55e of the spring storing recess 55d to bias the pressing surface 55e radially inward. Therefore, the guiding members 55 are biased radially inward by the holding springs 56 to press against the holding case 54.

Further, a through hole 57d axially penetrating the cover 57 is formed at a position inward from each of the pressing portions 57c in the radial direction in the cover 57. The through holes 57d are formed at the position axially opposite to the spring storing recesses 55d of the guiding members 55. For this reason, the holding springs 56 stored in the respective spring storing recesses 55d are exposed from the through holes 57d to the outside of the clutch 50.

The driven-side rotating body 58 includes a closed-end cylindrical driven cylindrical portion 58a and a driven-side axial coupling portion 58b formed integrally with the driven cylindrical portion 58a. As shown in FIG. 1, the driven-side rotating body 58 is stored in the clutch storing portion 31b so that the opening of the driven cylindrical portion 58a faces the motor main unit 12.

As shown in FIG. 3, the driven cylindrical portion 58a has the same outer diameter as the holding case 54 and the cover 57. Further, the axial inner depth of the driven-side rotating body 58 is substantially the same as the axial length of the driving-side rotating body 51. As shown in FIG. 4A, control projections 58d protruding radially inward are formed at three places at regular angular intervals (in this embodiment, at intervals of 120 degrees) in the circumferential direction on an inner circumference of a cylindrical side wall portion 58c of the driven cylindrical portion 58a. In the driven-side rotating body 58, the inner diameter of the area where the control projection 58d is formed is slightly larger than the outer diameter of the driving-side rotating body 51. As shown in FIG. 3, the outer periphery of the driving-side rotating body 51 stored in the driven cylindrical portion 58a is opposite to the control projections 58d in the radial direction. Furthermore, the power transmitting portions 53a of the roller members 53 are arranged between the driving-side rotating body 51 and the side wall portion 58c of the driven-side rotating body 58 that are radially opposite to each other. The driving-side rotating body 51, the holding case 54, the cover 57 and the driven-side rotating body 58 are coaxially arranged (their central axes match with one another, see the line formed by a long dash alternating with one short dash in FIG. 3). Further, an end of the side wall portion 58c on the side of the opening of the driven cylindrical portion 58a is axially opposite to the outer periphery of the holding case 54.

As shown in FIG. 4A, a control recess 58e is provided between the control projections 58d adjacent to each other in the circumferential direction in the driven-side rotating body 58. The three control recesses 58e are formed at regular angular intervals (in this embodiment, at intervals of 120 degrees) in the circumferential direction. Further, the circumferential width of the control recesses 58e is set to be wider than that of the control grooves 51e formed on the driving-side rotating body 51. Inner side surfaces on both circumferential sides of the control recess 58e (circumferential end surfaces of the control projection 58d) constitute a pair of transmitting surfaces 58f having a circumferential distance therebetween that becomes larger toward the radially inner end. Each of the transmitting surfaces 58f is a flat surface in parallel to the axial direction, and the radial gradient of the transmitting surfaces 58f is equal to that of the contact surfaces 53d formed on the power transmitting portions 53a.

Further, as shown in FIG. 3, a plate recess 58g opened to the inner side of the driven cylindrical portion 58a is formed at the center of the bottom of the driven cylindrical portion 58a, and a disc-like thrust receiving plate 62 is stored in the plate recess 58g. The thrust receiving ball 61 arranged in the ball storing hole 51b of the driving-side rotating body 51 is in contact with the thrust receiving plate 62. The thrust receiving plate 62 along with the thrust receiving ball 61 receive a thrust load via the rotary shaft 20.

The driven-side axial coupling portion 58b axially extends from the center of the bottom of the driven cylindrical portion 58a and protrudes toward the outside of the driven cylindrical portion 58a. Further, as shown in FIG. 1, the driven-side axial coupling portion 58b is columnar and has the same outer diameter as that of a worm-side axial coupling portion 32b formed on the proximal end (upper end in FIG. 1) of the worm shaft 32. Axial coupling recesses 32c are formed at three places at regular angular intervals (at intervals of 120 degrees) in the circumferential direction on a proximal end surface (upper end surface in FIG. 1) of the worm-side axial coupling portion 32b. FIG. 1 shows only one of the three axial coupling recesses 32c. Each of the axial coupling recesses 32c is formed on the proximal end surface of the worm-side axial coupling portion 32b in the axial direction of the worm shaft 32 and is opened to the proximal end of the worm shaft 32 and radially outward.

As shown in FIG. 3, axial coupling projections 58h corresponding to the axial coupling recesses 32c (refer to FIG. 1) are protrudingly formed at a distal end of the driven-side axial coupling portion 58b. The axial coupling projections 58h axially protrude at three places at regular angular intervals (at intervals of 120 degrees) in the circumferential direction on the outer periphery of the distal end of the driven-side axial coupling portion 58b. Further, the circumferential width, the radial width and the axial length of the axial coupling projections 58h are the same as the circumferential width, the radial width and the axial depth of the axial coupling recesses 32c (refer to FIG. 1), respectively. As shown in FIGS. 1 and 3, by inserting the three axial coupling projection 58h into the three axial coupling recesses 32c of the worm shaft 32, respectively, the driven-side rotating body 58 and the worm shaft 32 are engaged with each other in the rotational direction to be integrally rotatable. The driven-side axial coupling portion 58b protrudes from the bottom of the clutch storing portion 31b into the shaft storing cylindrical portion 31c and is axially supported by the bearing 36 arranged at one end of the shaft storing cylindrical portion 31c.

Further, a thrust recess 58k is formed at the center of a distal end surface of the driven-side axial coupling portion 58b. The thrust recess 58k communicates to the plate recess 58g through a coupling hole 58m axially extending from the center of a bottom of the thrust recess 58k. A disc-like thrust receiving plate 63 and a spherical thrust receiving ball 64 are stored in the thrust recess 58k. This thrust receiving plate 63 and thrust receiving ball 64 receive the thrust load via the worm shaft 32.

Next, operation of the above-described motor 11, particularly operation of the clutch 50, will be described below.

When the rotary shaft 20 is not rotatably driven, for example, during stopping of the motor main unit 12, no centrifugal force is applied to each of the guiding members 55. For this reason, as shown in FIG. 5A, the guiding members 55 are biased by the biasing force of the holding springs 56 radially inward and thus, are located radially innermost in the movement range of the guiding members 55. Furthermore, the relative rotational position between the driving-side rotating body 51 and the holding case 54 is kept to be a position where the cam engaging portions 53b are located at the first guiding portion P1 of the cam grooves 55c by the biasing force of the case holding springs 52 for biasing the engaging projections 54b (neutral position). That is, the driving-side rotating body 51 and the holding case 54 are kept at the neutral position. Accordingly, the roller members 53 are located radially innermost in the radial movement range, that is, at the non-engaging position where the roller members 53 and the driven-side rotating body 58 do not engage with each other in the rotational direction. For this reason, the clutch 50 is turned off (the rotary shaft 20 is uncoupled from the driven shaft 32).

In this state, when the output shaft 35 is rotated from the side of the slide door 3, as shown in FIGS. 1 and 2, to manually open or close the slide door 3, the worm shaft 32 is rotated with rotation of the output shaft 35. As described above, when the rotary shaft 20 is not rotatingly driven, as shown in FIG. 5A, the roller members 53 are located at the non-engaging position. The driven-side rotating body 58 does not engage with the roller members 53 in the rotational direction and the rotary shaft 20 is uncoupled from the worm shaft 32. Accordingly, with rotation of the worm shaft 32, the driven-side rotating body 58 idles relative to the driving-side rotating body 51 and the holding case 54. Thus, since the rotary shaft 20 as a rotational load from the side of the output shaft 35 is separated from the worm shaft 32, rotation from the side of the output shaft 35 becomes easy. Therefore, manual operation of opening/closing the slide door 3 can be easily performed without requiring a large operating force.

When an instruction to automatically open or close the slide door 3 is made, the controller 25 shown in FIG. 1 drives the motor main unit 12 to rotatingly drive the rotary shaft 20. When rotational driving of the driving-side rotating body 51 is started with rotational driving of the rotary shaft 20, as shown in FIG. 5B, the roller members 53 having the power transmitting portions 53a held in the control grooves 51e of the driving-side rotating body 51 also rotate together with the driving-side rotating body 51 about the central axis of the driving-side rotating body 51. On the other hand, since the holding case 54 holds the guiding members 55 that function as weights, at start of rotational driving of the driving-side rotating body 51, the rotational position of the holding case 54 is maintained by the inertial force. The holding case 54 coupled to the driving-side rotating body 51 via the case holding springs 52 starts to rotate with a delay from rotation of the driving-side rotating body 51. As a result, at start of rotational driving, the driving-side rotating body 51 rotates relative to the holding case 54 while contracting the case holding springs 52 between the driving-side rotating body 51 and the engaging projections 54b against the biasing force of the case holding springs 52. A difference between the driving-side rotating body 51 and the holding case 54 in rotational angle is generated. Then, since the cam engaging portions 53b are rotated relative to the cam grooves 55c in the circumferential direction of the holding case 54, the cam engaging portions 53b are moved from the first guiding portion P1 toward the second guiding portion P2 located forward in the rotational direction while being guided by the cam groove 55c. When being guided by the cam grooves 55c, the roller members 53 are moved to the radially outer engaging position. At start of rotational driving of the driving-side rotating body 51, the rotational position of the holding case 54 is maintained by the inertial force. For this reason, no centrifugal force is applied to the guiding members 55 held by the holding case 54. Therefore, when the cam engaging portions 53b are relatively moved from the first guiding portion P1 to the second guiding portion P2 at start of rotational driving of the driving-side rotating body 51, the guiding members 55 are located radially innermost in the radial movement range.

Furthermore, with rotation of the driving-side rotating body 51, radially outer ends of the power transmitting portions 53a of the roller members 53 arranged at the engaging position come into contact with the transmitting surfaces 58f located forward in the rotational direction of the driving-side rotating body 51, respectively, in the control recesses 58e. At this time, of the pair of contact surfaces 53d of the power transmitting portion 53a, the contact surface 53d located forward in the rotational direction of the driving-side rotating body 51 comes into surface contact with the transmitting surface 58f located forward in the rotational direction of the driving-side rotating body 51. In this manner, the clutch 50 is turned on, thereby coupling the rotary shaft 20 to the worm shaft 32. When the clutch 50 is turned on, the rotational driving force of the rotary shaft 20 can be transmitted from the driving-side rotating body 51 to the driven-side rotating body 58 through the power transmitting portions 53a of the roller members 53.

As the rotational speed of the driving-side rotating body 51 increases, the inertial force applied to the holding case 54 holding the guiding members 55 becomes smaller. Furthermore, when the rotational speed of the driving-side rotating body 51 becomes constant, the inertial force applied to the holding case 54 holding the guiding members 55 disappears. As the inertial force applied to the holding case 54 becomes smaller, the holding case 54 is rotated in the same direction as the rotational direction of the driving-side rotating body 51 relative to the driving-side rotating body 51 by the biasing force of the case holding springs 52. With this rotation of the holding case 54 relative to the driving-side rotating body 51, the cam grooves 55c of the guiding members 55 held by the holding case 54 are rotated relative to the cam engaging portions 53b in the circumferential direction of the holding case 54 and thus, the cam engaging portions 53b are relatively moved from the second guiding portion P2 to the first guiding portion P1. However, since the centrifugal force applied to the guiding members 55 gradually increases with an increase in the rotational speed of the holding case 54, the guiding members 55 are moved radially outward against the biasing force of the holding springs 56 while being guided by the holding recesses 54c. For this reason, the radial position of the cam engaging portions 53b is maintained without being moved radially inward. That is, the roller members 53 are kept at the engaging position by the guiding members 55. As shown in FIG. 6, with the increase in the rotational speed of the driving-side rotating body 51, the centrifugal force applied to the roller members 53 rotating integrally with the driving-side rotating body 51 also increase. For this reason, the roller members 53 are prevented from moving from the engaging position radially inward by the centrifugal force applied to the roller members 53.

As shown in FIG. 5C, when the rotational speed of the driving-side rotating body 51 becomes constant and the inertial force applied to the holding case 54 disappears, the driving-side rotating body 51 and the holding case 54 are kept at the neutral position by the biasing force of the case holding springs 52. Furthermore, when the rotational speed of the driving-side rotating body 51 becomes constant, the guiding members 55 are located radially outermost in the movement range of the guiding members 55 by the centrifugal force, and the cam engaging portions 53b of the roller members 53 arranged at the engaging position are located at the first guiding portion P1 of the cam grooves 55c. Further, the roller members 53 are prevented from moving from the engaging position to the non-engaging position inward from the engaging position in the radial direction by the centrifugal force applied to the guiding members 55. The rotational driving force of the rotary shaft 20 is transmitted from the driving-side rotating body 51 to the driven-side rotating body 58 through the power transmitting portions 53a of the roller members 53. Therefore, since the driven-side rotating body 58 and the worm shaft 32 rotate integrally with each other as shown in FIGS. 1 and 2, rotational force reduced by the worm portion 32a and the worm wheel 33 is output from the output shaft 35, resulting in that the slide door 3 is automatically opened or closed.

Figure 5D:
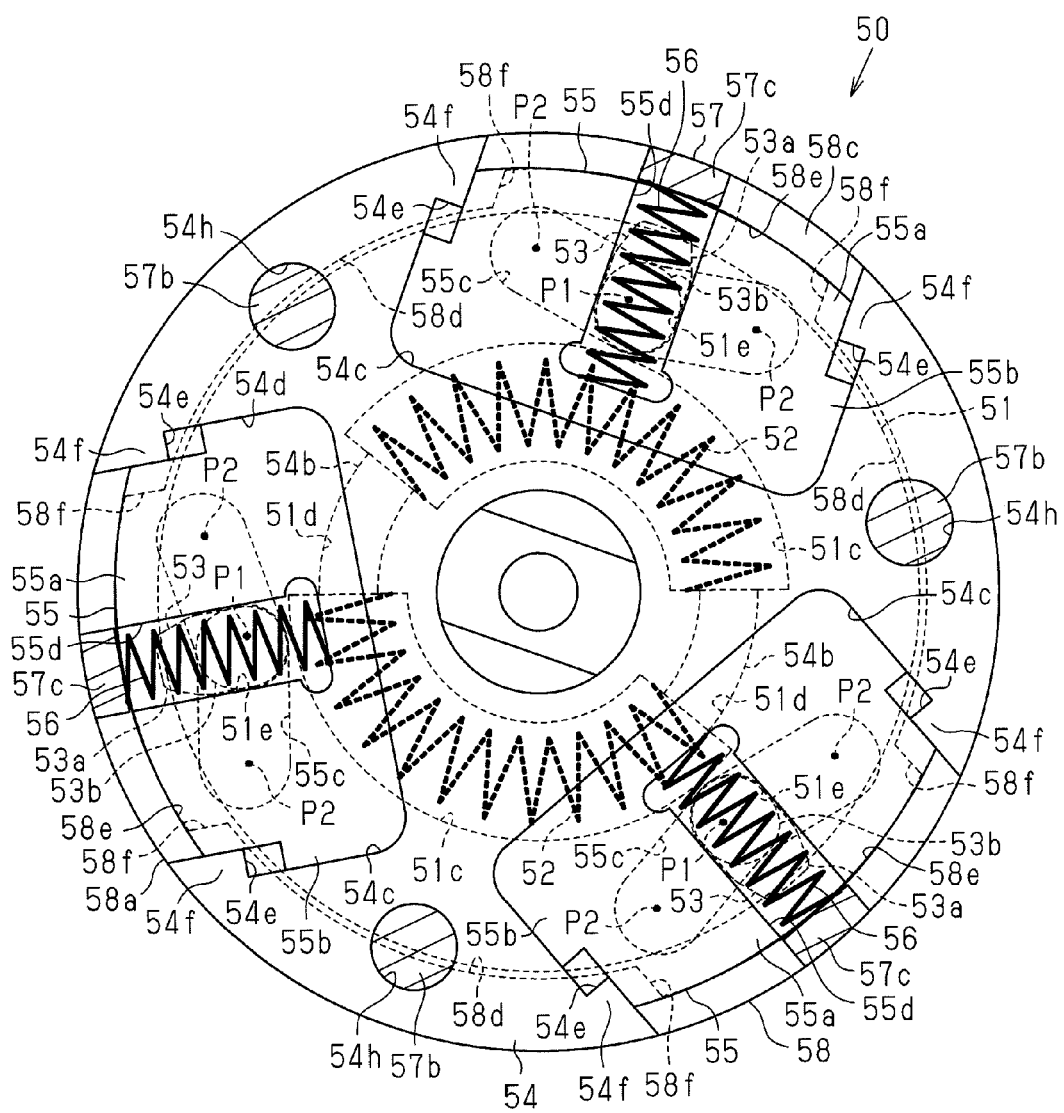

When automatic opening or closing of the slide door 3 is finished, the motor main unit 12 is stopped. When the motor main unit 12 is stopped, as shown in FIG. 5D, the rotational speed of the rotary shaft 20 lowers and thus, the rotational speed of the driving-side rotating body 51 also becomes lower. In this connection, the rotational speed of the holding case 54 and the driven-side rotating body 58 that are rotated by the rotational driving force transmitted from the driving-side rotating body 51 also becomes lower. As a result, since the centrifugal force applied to the guiding members 55 becomes smaller, the guiding members 55 are moved radially inward by the biasing force of the holding springs 56. If the motor main unit 12 stops abruptly, although the rotational speed of the driving-side rotating body 51 drops quickly, the rotational speed of the holding case 54 is lowered relatively slowly because of the inertial force. As a result, since the holding case 54 rotates relative to the driving-side rotating body 51, a difference between the driving-side rotating body 51 and the holding case 54 in rotational angle occurs. As a result, the cam grooves 55c are rotated relative to the cam engaging portions 53b in the circumferential direction of the holding case 54. At this time, as shown in FIG. 6 as the radial movement of the roller member 53 after stopping of the motor main unit 12, the roller members 53 are kept at the engaging position by the cam grooves 55c. Ultimately, since the holding case 54 is arranged at the neutral position by the biasing force of the case holding springs 52, the roller members 53 are arranged at the non-engaging position by the cam grooves 55c. As a result, engagement between the driving-side rotating body 51 and the driven-side rotating body 58 in the rotational direction is cancelled, and the rotary shaft 20 is uncoupled from the worm shaft 32. In FIG. 6, a line formed by a long dash alternating with one short dash indicates the movement of the roller members 53 along the cam grooves 55c and the rightmost portion of the line corresponds to the movement of the roller members 53 from the non-engaging position to the engaging position after stopping of the motor main unit 12. The rightmost portion of the line is slightly shifted from the corresponding portion of a solid line that indicates the total movement of the roller members 53 for clarity of the movement of the roller members 53.

When the holding case 54 does not rotate relative to the driving-side rotating body 51 during stopping of the motor main unit 12, since the cam engaging portions 53b of the roller members 53 are inserted into the cam groove 55c of the guiding members 55, the roller members 53 together with the guiding members 55 are moved radially inward as the centrifugal force applied to the guiding members 55 becomes smaller. At this time, the cam engaging portions 53b are located at the first guiding portion P1 in the cam grooves 55c. Therefore, the roller members 53 are moved from the engaging position to the non-engaging position. As a result, engagement between the driving-side rotating body 51 and the driven-side rotating body 58 in the rotational direction is cancelled, and the rotary shaft 20 is uncoupled from the worm shaft 32. In this case, the roller members 53 move radially inward due to a decrease in the centrifugal force, not by guiding of the cam grooves 55c.

FIGS. 5B and 5C show the clutch 50 in the case where the driving-side rotating body 51 (rotary shaft 20) rotates clockwise. However, also in the case where the rotary shaft 20 is rotated counterclockwise in FIGS. 5B and 5C, similarly, the clutch 50 couples the rotary shaft 20 to the worm shaft 32.

As described above, the first embodiment has following advantages.

(1) At the start of rotational driving of the driving-side rotating body 51, with relative rotation between the driving-side rotating body 51 and the holding case 54, the roller members 53 held by the driving-side rotating body 51 and the cam grooves 55c of the guiding members 55 held by the holding case 54 rotate relative to each other. When the driving-side rotating body 51 and the holding case 54 rotate relative to each other, the roller members 53 move from the non-engaging position to the engaging position while being guided by the cam grooves 55c. In this manner, the roller members 53 are stably moved from the non-engaging position to the engaging position in the state where the moving direction is restricted by the cam grooves 55c (while being guided by the cam grooves 55c). Therefore, the reliability of the operation of turning on the clutch 50 (that is, the operation of coupling the driving-side rotating body 51 to the driven-side rotating body 58) can be improved.

(2) During rotational driving of the driving-side rotating body 51, the roller members 53 are held at the engaging position by the guiding members 55 as moved radially outward by centrifugal force. Therefore, since the ON state of the clutch 50 is stably maintained, the rotational driving force can be stably transmitted from the driving-side rotating body 51 to the driven-side rotating body 58 through the roller members 53. Further, since the roller members 53 are held at the engaging position by the guiding members 55, there is no need to separately provide any means for generating the frictional force or the like in order to keep the state where the driving-side rotating body 51 is coupled to the driven-side rotating body 58 during rotational driving of the driving-side rotating body 51. Thus, the configuration and operation of the clutch 50 can be prevented from becoming complicated.

(3) The guiding members 55 are biased radially inward by the holding springs 56. When the driving-side rotating body 51 is stopped, the roller members 53 tend to move to the engaging position more easily than to the non-engaging position inward from the engaging position in the radial direction by the biasing force of the holding springs 56 for biasing the guiding members 55 radially inward. Therefore, the reliability of the operation of turning off the clutch 50 (that is, the operation of uncoupling the driving-side rotating body 51 from the driven-side rotating body 58) can be improved. Further, during stopping of the driving-side rotating body 51 (that is, during turning-off of the clutch 50), the roller members 53 are prevented from suddenly moving from the non-engaging position to the engaging position. Furthermore, since the guiding members 55 are biased radially inward by the holding springs 56, the guiding members 55 and the roller members 53 are prevented from being unsteady due to vibrations during driving of the vehicle and the like. Therefore, it is possible to prevent occurrence of noises generated due to chattering of the guiding members 55 and the roller members 53.

(4) The case holding springs 52 are interposed between the driving-side rotating body 51 and the holding case 54. The case holding springs 52 bias the holding case 54 so that the driving-side rotating body 51 and the holding case 54 are kept at the relative rotational position so as to locate the roller members 53 at the non-engaging position. For this reason, during stopping of the driving-side rotating body 51 (that is, during turning-off of the clutch 50), the roller members 53 is easily kept at the non-engaging position. Further, since relative rotation between the driving-side rotating body 51 and the holding case 54 is prevented during stopping of the driving-side rotating body 51 by the biasing force of the case holding springs 52, the roller members 53 are prevented from suddenly moving to the engaging position.

(5) The roller members 53 located between the non-engaging position and the engaging position are moved while being guided by the grooved cam grooves 55c. As described above, since portions (cam portions) formed on the guiding members 55 to guide movement of the roller members 53 are the grooved cam groove 55c, it is possible to prevent an increase of the guiding members 55 in size as well as to miniaturize the guiding members 55. Therefore, this can contribute to miniaturization of the clutch 50.

(6) At the start of rotational driving of the driving-side rotating body 51, the driving-side rotating body 51 and the holding case 54 are rotated relative to each other by the inertial force applied to the holding case 54. For this reason, there is no need to separately provide any means for rotating the driving-side rotating body 51 and the holding case 54 relative to each other in order to move the roller members 53 from the non-engaging position to the engaging position.

(7) The motor 11 includes a clutch 50 that can be turned on and off with improved reliability. Therefore, in the motor 11, at the start of driving of the motor main unit 12, the rotational driving force is smoothly transmitted from the rotary shaft 20 to the worm shaft 32. On the other hand, during stopping of the motor main unit 12, rotation from the driven side becomes easy through uncoupling between the rotary shaft 20 and the worm shaft 32. Further, the clutch 50 is provided between the rotary shaft 20 of the motor main unit 12 and the worm shaft 32 of the decelerating mechanism 34, that is, at a place in the motor 11, where the rotational driving force of the rotary shaft 20 is not reduced. Accordingly, since load applied to each component constituting the clutch 50 can be made small, the clutch 50 can be miniaturized. Thus, the motor 11 provided with the clutch 50 can be also miniaturized. The miniaturized motor 11 can be easily installed in a small space such as the inside of the slide door 3. Further, by providing the clutch 50 at the place in the motor 11, where the rotational driving force is not reduced, the centrifugal force applied to the guiding members 55 tends to occur. Therefore, such a motor is advantageous for a clutch 50 having a configuration in which the guiding members 55 are moved radially outward by centrifugal force.

(8) The motor 11 used as a drive source is provided with the clutch 50 that can be turned on and off with improved reliability. Generally, the slide door opening/closing device 1 that automatically opens and closes the slide door 3 by the drive force of the motor 11 need to be able to manually open or close the slide door 3. For this reason, by using the motor 11 as the drive source, the slide door 3 can be easily opened and closed by hand. Further, when the motor main unit 12 is driven according to an instruction to automatically open or close the slide door 3, the clutch 50 smoothly couples the rotary shaft 20 to the worm shaft 32, thereby smoothly starting the operation of opening or closing the slide door 3.

(9) The guiding members 55 each having the cam groove 55c generate the inertial force applied to the holding case 54 at the start of rotational driving of the driving-side rotating body 51. For this reason, the inertial force can be generated in the holding case 54 with simple configuration. Further, as compared to the case where mass of the holding case 54 itself is increased to generate the inertial force, the weight of the clutch 50 can be made smaller.

(10) During rotational driving of the driving-side rotating body 51, when the roller members 53 engage with the driven-side rotating body 58 in the rotational direction, the roller members 53 come into surface contact with the driven-side rotating body 58. For this reason, when the rotational driving force is transmitted from the roller members 53 to the driven-side rotating body 58, pressure applied to the roller members 53 and the driven-side rotating body 58 can be made small.

(11) The holding springs 56 bias the guiding members 55 radially inward. Therefore, the force to prevent movement of the cam engaging portion 53b in the cam groove 55c (movement in the circumferential direction) is difficult to be applied to the cam engaging portion 53b. Therefore, the cam engaging portion 53b can be smoothly moved in the cam groove 55c.

Second Embodiment

A second embodiment that embodies the present invention will be described below with reference to the figures. Components that are the same as those in the first embodiment are designated with the same reference numerals and description thereof is not repeated in the second embodiment.

In place of the clutch 50 in the first embodiment, a clutch 70 in the second embodiment shown in FIG. 7 is provided in the motor 11 (refer to FIG. 1). The clutch 70 includes a driving-side rotating body 71, the two case holding springs 52, the three roller members 53, the holding case 54, the three guiding members 55, the three holding springs 56, the cover 57 and the driven-side rotating body 58.

The driving-side rotating body 71 includes a first drive plate 81 (first rotating body), a second drive plate 82 (second rotating body) overlapped on the first drive plate 81 and three return springs 83 (return biasing member).

The first drive plate 81 is substantially disc-like and has an outer diameter that is slightly smaller than the inner diameter of the region where the control projections 58d are formed in the driven-side rotating body 58. A columnar driving-side axial coupling portion 81a protruding in the axial direction of the first drive plate 81 (that is, the axial direction of the clutch 70) is formed at the radial center of the first drive plate 81. The shaft coupling recess 51a is formed at the radial center of the driving-side axial coupling portion 81a (that is, the radial center of the first drive plate 81). Further, the ball storing hole 51b axially penetrating from the bottom of shaft coupling recess 51a is formed on the first drive plate 81. The thrust receiving ball 61 is stored in the ball storing hole 51b.

Figure 8:
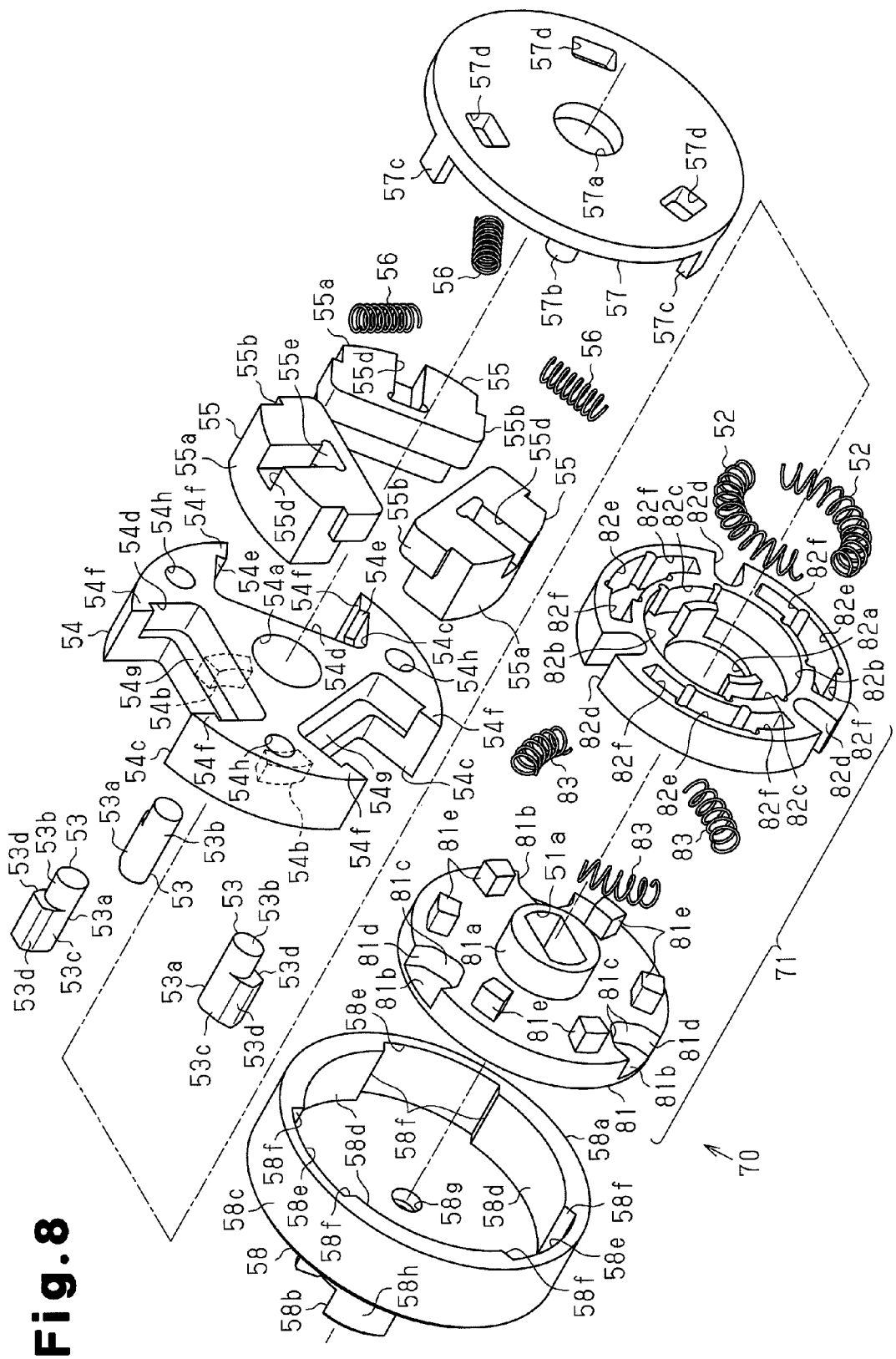
FIG. 8 is an exploded perspective view showing the clutch in FIG. 7.

As shown in FIG. 8, three auxiliary grooves 81b are formed on an outer periphery of the first drive plate 81. The three auxiliary grooves 81b are formed at three places at regular angular intervals (in this embodiment, at intervals of 120 degrees) in the circumferential direction in the first drive plate 81. Each of the auxiliary grooves 81b is formed from the outer periphery of the first drive plate 81 radially inward to be opened radially outward. Each of the auxiliary grooves 81b is open toward only the opposite side (that is, the side of the second drive plate 82) to the bottom of the driven-side rotating body 58 in the axial direction.

A pair of wedge-shaped surfaces 81c are formed on an inner circumferential surface of each of the auxiliary grooves 81b. The pair of wedge-shaped surfaces 81c each are shaped like a flat surface parallel to the axial direction and inclined relative to the radial direction of the first drive plate 81 so that the circumferential distance between the wedge-shaped surfaces 81c becomes larger toward the radially outer end from the radial inner side. Furthermore, each of the wedge-shaped surfaces 81c is larger than the each of the transmitting surfaces 58f of the driven-side rotating body 58 and is inclined relative to the radial direction. Further, a pair of restricting surfaces 81d is formed radially outward from the pair of wedge-shaped surfaces 81c on the inner circumferential surface of each of the auxiliary grooves 81b. In each of the auxiliary grooves 81b, the pair of restricting surfaces 81d is formed between the opening of the auxiliary grooves 81b on the radially outer side and the pair of wedge-shaped surfaces 81c, and opposite to each other in the circumferential direction. The restricting surfaces 81d each are shaped like a flat surface in parallel to the axial direction and inclined relative to the radial direction by a smaller extent than the wedge-shaped surfaces 81c. In this embodiment, the restricting surfaces 81d are formed substantially along the radial direction.

Further, three pairs of return projections 81e protruding in the axial direction of the first drive plate 81 are formed on an end surface of the first drive plate 81 on the side of the second drive plate 82. In the first drive plate 81, the pairs of return projections 81e are formed at three places at regular angular intervals (in this embodiment, at intervals of 120 degrees) in the circumferential direction, which are each located between auxiliary grooves 81b adjacent to each other in the circumferential direction. The pairs of return projections 81e are spaced apart in the circumferential direction of the first drive plate 81 and are each shaped like a rectangular parallelepiped protruding axially.

The second drive plate 82 is shaped like a disc having the same diameter as that of the first drive plate 81. An insertion hole 82a axially penetrating the second drive plate 82 is formed at the radial center of the second drive plate 82. The insertion hole 82a is circular when viewed from the axial direction and has an inner diameter that is slightly larger than the outer diameter of the driving-side axial coupling portion 81a.

Further, a pair of spring storing portions 82b are formed on the radially outer side of the insertion hole 82a in the second drive plate 82. The two spring storing portions 82b are formed in the axial direction of the second drive plate 82, on the end surface on the opposite side (that is, the side of the holding case 54) to the first drive plate 81 in the second drive plate 82. The two spring storing portions 82b are each shaped like an arc surrounding the insertion hole 82a and are symmetrical about the insertion hole 82a. The case holding springs 52 are stored in the spring storing portions 82b, respectively.

Further, engaging recesses 82c are formed between adjacent circumferential ends of the two spring storing portions 82b in the second drive plate 82, that is, at two places at intervals of 180 degrees in the circumferential direction. Each of the engaging recesses 82c is formed on an end surface of the second drive plate 82 on the opposite side to the first drive plate 81 (that is, opposite to the holding case 54) in the axial direction of the second drive plate 82. The engaging recesses 82c each are shaped like an arc having the central axis of the second drive plate 82 as the center of curvature. Further, the engaging recesses 82c are formed to be concentric with the spring storing portions 82b and the radial width of the engaging recesses 82c is smaller than that of the spring portions 82b and is equal to that of the engaging projections 54b. Furthermore, the engaging recesses 82c are each in communication with the two spring storing portions 82b adjacent to each other in the circumferential direction.

Three control grooves 82d are formed on the outer periphery of the second drive plate 82. The three control grooves 82d are formed at three places on the second drive plate 82 at regular angular intervals (in this embodiment, at intervals of 120 degrees) in the circumferential direction. Each of the control grooves 82d is formed from the outer periphery of the second drive plate 82 radially inward to be opened radially outward. Each of the control grooves 82d axially penetrates the second drive plate 82 and is U-shaped and opened radially outward when viewed from the axial direction. Furthermore, the circumferential width of the control grooves 82d is substantially equal to the width in the transverse direction of the power transmitting portions 53a (that is, the width between the two guiding surfaces 53c).

Further, a spring storing hole 82e is formed between control grooves 82d adjacent to each other in the circumferential direction in the second drive plate 82. That is, the three spring storing holes 82e are provided at regular angular intervals (in this embodiment, at intervals of 120 degrees) in the circumferential direction. Each of the spring storing holes 82e axially penetrates the second drive plate 82 and is shaped like an arcuate groove extending along the circumference of the second drive plate 82. Furthermore, the circumferential length of the spring storing holes 82e is equal to the distance between the pair of return projections 81e of the first drive plate 81 (distance in the circumferential direction). The return springs 83 each formed of a compression coil spring are stored in the respective spring storing holes 82e.

Furthermore, a pair of return holes 82f are formed on both circumferential sides of each of the spring storing holes 82e. That is, the three pairs of return holes 82f are formed on the second drive plate 82. The pair of return holes 82f on both circumferential sides of each of the spring storing holes 82e axially penetrate the second drive plate 82. The radial width of the return holes 82f is smaller than that of the spring storing holes 82e and is substantially equal to the radial width of the return projections 81e. Further, the circumferential width of the return holes 82f is wider than that of the return projections 81e. Furthermore, an inner space of each of the spring storing holes 82e is connected to inner spaces of the return holes 82f on both circumferential sides of the spring storing hole 82e.

As shown in FIGS. 7 and 8, the second drive plate 82 is axially overlapped on the first drive plate 81 so that the end surface of the second drive plate 82 where the spring storing portions 82b are not open is opposite to the end surface of the first drive plate 81 where the return projections 81e protrude. The driving-side axial coupling portion 81a of the first drive plate 81 is inserted into the insertion hole 82a of the second drive plate 82. Furthermore, the pair of return projections 81e are axially inserted into the pair of return holes 82f, respectively, and the return springs 83 are each arranged between the pair of return projections 81e (that is, in the spring storing hole 82e). The axial width of the driving-side rotating body 71 is substantially equal to that of the side wall portion 58c of the driven-side rotating body 58.

Figure 10A:
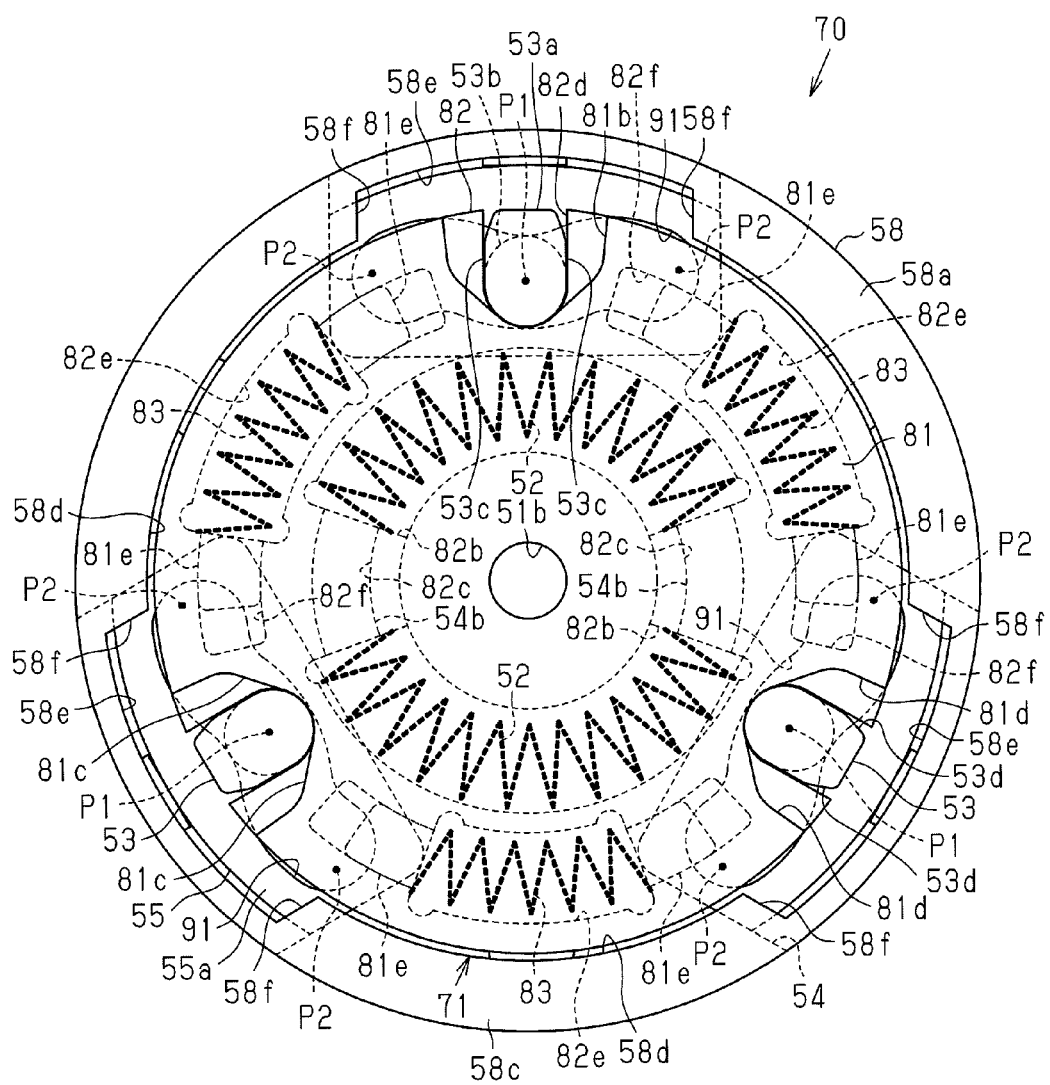
FIG. 10A is a sectional view showing the clutch along line 10A-10A in FIG. 7.

In the driving-side rotating body 71, the first drive plate 81 and the second drive plate 82 are coaxially arranged (their central axes match with one another) and the first drive plate 81 is coupled to the second drive plate 82 in the rotational direction via the return springs 83. The first drive plate 81 and the second drive plate 82 are held at a predetermined relative rotational position via the return springs 83. In this embodiment, the return springs 83 bias the first drive plate 81 (return projections 81e) so that the relative rotational position between the first drive plate 81 and the second drive plate 82 is kept to a rotational position where the circumferential position of the auxiliary grooves 81b matches with the circumferential position of the control grooves 82d. Therefore, as shown in FIG. 10A, during non-driving of the rotary shaft 20, when viewed from the axial direction of the driving-side rotating body 71, the circumferential center of the three auxiliary grooves 81b matches with that of the three control grooves 82d. Although sectional views of the clutch 70 of FIGS. 10A to 10D are taken along line 10A-10A in FIG. 7, hatching is omitted to prevent complicating of the figures.

Figure 10C:
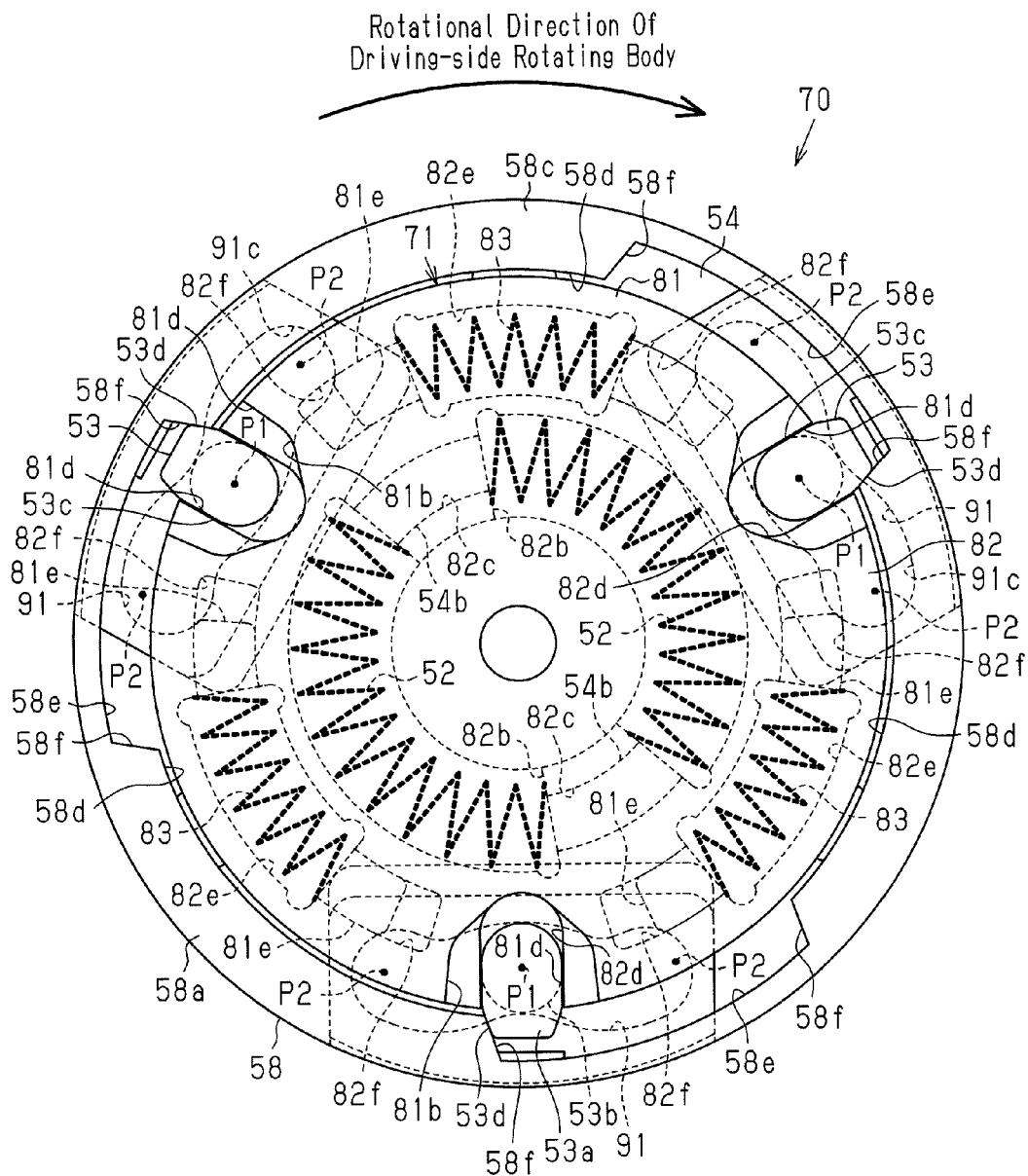
Figure 10D:
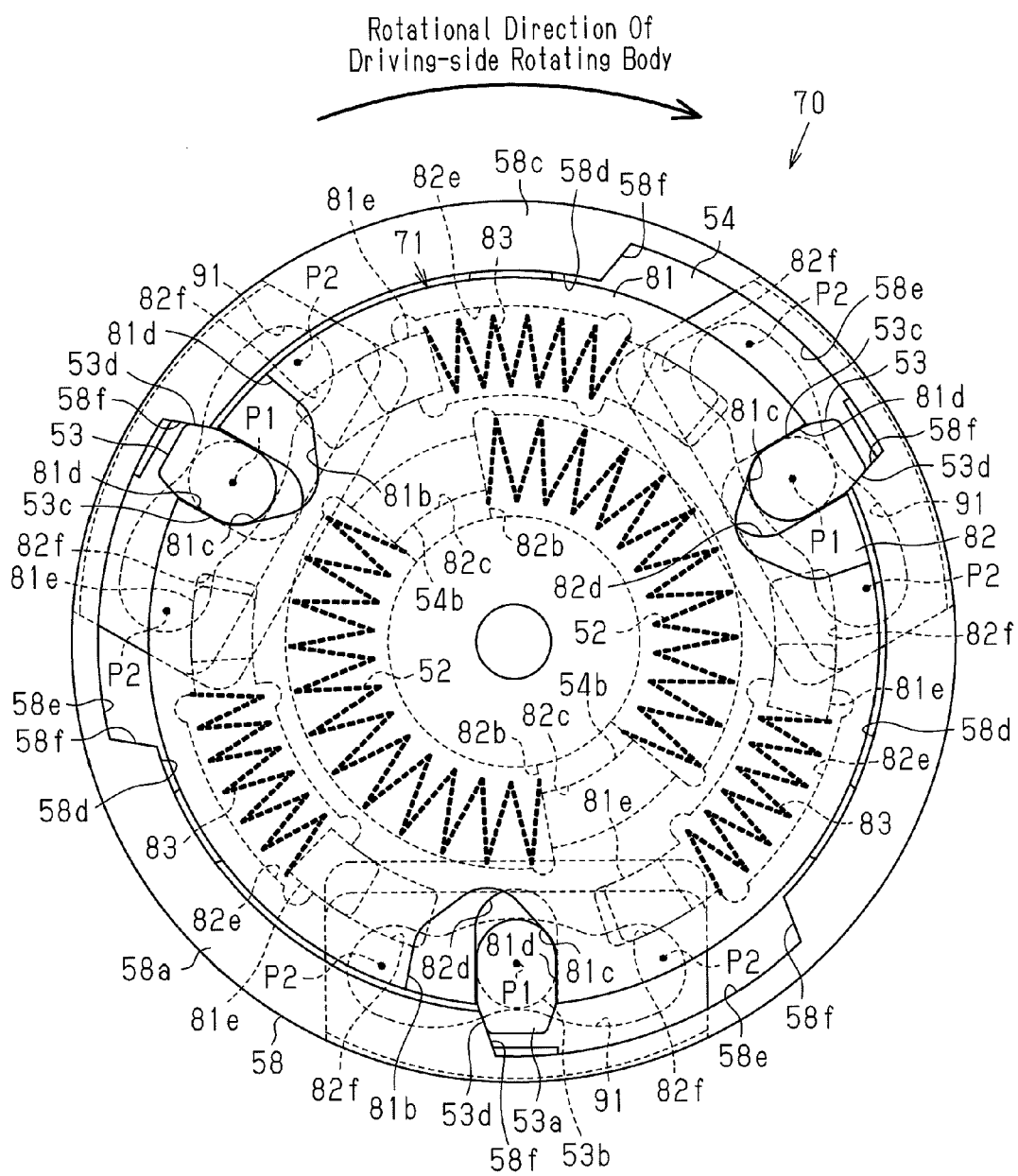

As shown in FIG. 8, the driving-side rotating body 71 is arranged within the driven-side rotating body 58 so that the first drive plate 81 is located at the bottom side of the driven-side rotating body 58 and the second drive plate 82 is located at the opened side of the driven-side rotating body 58. The three roller members 53 are arranged so that the power transmitting portions 53a are stored in the three auxiliary grooves 81b and the control grooves 82d of the driving-side rotating body 71, respectively, and the cam engaging portions 53b axially protrude toward the holding case 54 further than the driving-side rotating body 71. One axial end of the power transmitting portion 53a (axial end on the opposite side to the cam engaging portion 53b) is stored in the auxiliary groove 81b and the other axial end (axial end on the side of the cam engaging portion 53b) is stored in the control groove 82d axially aligned with the auxiliary groove 81b. The cam engaging portions 53b of the roller members 53 are inserted into a below-mentioned cam grooves 91 (cam portion) formed on one of the guiding members 55, respectively. The inner circumferential surfaces of the control grooves 82d guide movement of the roller members 53 in the radial direction of the driving-side rotating body 71 and restrict movement of the roller members 53 in the circumferential direction of the driving-side rotating body 71. As shown in FIG. 10D, when the first drive plate 81 and the second drive plate 82 rotate relative to each other, the wedge-shaped surfaces 81c can contact radially inner ends of the power transmitting portions 53a. Furthermore, when the wedge-shaped surfaces 81c contact radially inner ends of the power transmitting portions 53a, respectively, the restricting surfaces 81d adjacent to the wedge-shaped surfaces 81c are in surface contact of the guiding surfaces 53c of the power transmitting portions 53a, respectively, in the rotational direction.

As shown in FIG. 7, when the distal end of the rotary shaft 20 is inserted into the shaft coupling recess 51a through the through hole 57a of the cover 57 and the through hole 54a of the holding case 54, the first drive plate 81 engages with the distal end of the rotary shaft 20 in the rotational direction and can rotate integrally with the rotary shaft 20. The rotary shaft 20, the cover 57, the holding case 54, the second drive plate 82, the first drive plate 81 and the driven-side rotating body 58 are coaxially arranged (see the line formed by a long dash alternating with one short dash in FIG. 7).

Figure 9:
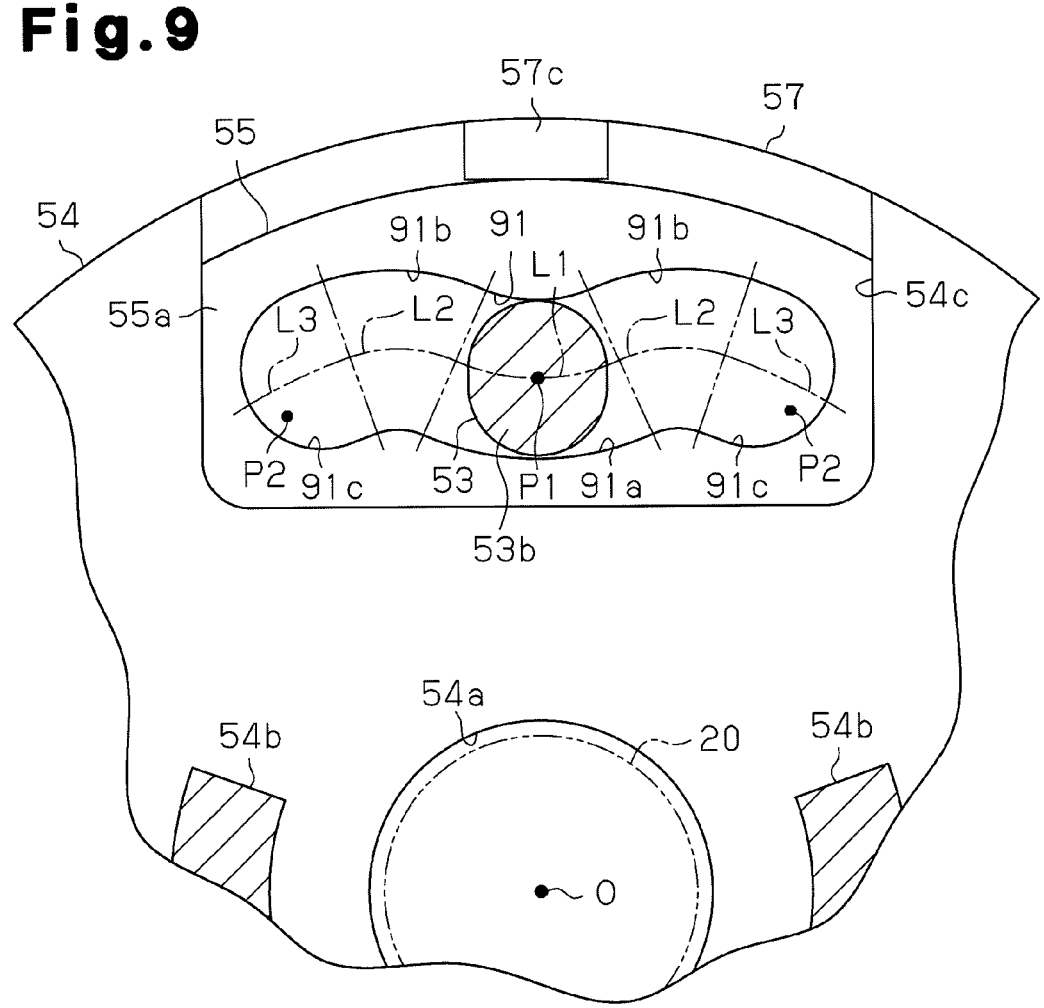
FIG. 9 is a sectional view showing the clutch along line 9-9 in FIG. 7.

As shown in FIG. 9, the shape of the cam groove 91 formed on each of the guiding members 55 in this embodiment is different from that of the cam groove 55c in the first embodiment. As shown in FIG. 7, like the cam groove 55c in the first embodiment, the cam groove 91 is axially formed on the end surface of the main body 55a on the side of the driving-side rotating body 71. Further, as shown in FIG. 9, the cam groove 91 is a groove extending substantially in the circumferential direction of the holding case 54. A first arc portion 91a shaped like an arc and protruding radially inward when viewed from the axial direction is formed at the circumferential center of the cam groove 91. That is, a first center line L1 of the first arc portion 91a is shaped like an arc protruding radially inward when viewed from the axial direction. The circumferential center of the first arc portion 91a is referred to as a first guiding portion P1. Furthermore, second arc portions 91b that are smoothly connected to the first arc portion 91a and protrude substantially radially outward are formed on both circumferential sides of the first arc portion 91a in the cam groove 91. Second center lines L2 of the second arc portions 91b each are shaped like an arc that is smoothly connected to the first center line L1 and protrudes substantially radially outward. Each of the second arc portions 91b is formed so as to extend radially outward as the distance from the center (first guiding portion P1) increases in the longitudinal direction of the cam groove 91. Furthermore, third arc portions 91c (engagement guiding portion) extending in the circumferential direction of the holding case 54 are formed on both sides of the second arc portions 91b (that is, both ends in the circumferential direction of the cam groove 91) in the cam groove 91. Third center lines L3 of the third arc portions 91c have the center O of the clutch 70 (radial center) as the center of curvature are each shaped like an arc (that is, a point of the central axis of the driving-side rotating body 71 is the center of curvature). The third arc portions 91c correspond to the second guiding portions P2. The width (width in the transverse direction) of the cam groove 91 is set to a value that is substantially equal to the diameter of the cam engaging portion 53b of the roller member 53.

In the cam groove 91, in the state where the guiding members 55 are held by the holding case 54, the circumferential center (that is, first guiding portion P1) is located at the radially innermost position. Further, the cam groove 91 extends radially outward from the circumferential center toward both circumferential sides. Furthermore, in the cam groove 91, the third arc portions 91c on the both circumferential sides are located at the radially outermost position. When the radial center of the cam engaging portion 53b is located on the third center line L3, the power transmitting portion 53a is located at the second guiding portion P2 where the driving-side rotating body 71 can engage with the driven-side rotating body 58 in the rotational direction.

Next, operation of the motor 11 provided with the clutch 70 in this embodiment, particularly, the operation of the clutch 70 will be described.

When the rotary shaft 20 is not rotatingly driven, for example, during stopping of the motor main unit 12, no centrifugal force is applied to the guiding members 55. For this reason, as shown in FIG. 10A, the guiding members 55 are biased radially inward by the biasing force of the holding springs 56 and are located radially innermost in the movement range of the guiding members 55. Furthermore, the relative rotational position between the driving-side rotating body 71 and the holding case 54 is maintained at the position where the cam engaging portions 53b are located at the first guiding portion P1 of the cam grooves 91 by the biasing force of the case holding springs 52 for biasing the engaging projections 54b (neutral position). The relative rotational position between the first drive plate 81 and the second drive plate 82 are maintained at the position where the circumferential position of the three auxiliary grooves 81b matches with the circumferential position of the three control grooves 82d by the biasing force of the return springs 83 for biasing the return projections 81e. Therefore, the roller members 53 are located radially innermost in the radial movement range and at the non-engaging position where the roller members 53 do not engage with the driven-side rotating body 58 in the rotational direction. For this reason, the clutch 70 is turned off (the rotary shaft 20 is uncoupled from the driven shaft 32).

In this state, when the output shaft 35 is rotated from the side of the slide door 3, the worm shaft 32 is rotated with rotation of the output shaft 35 to manually open or close the slide door 3 (refer to FIGS. 1 and 2). As described above, when the rotary shaft 20 is not rotatingly driven, the roller members 53 are located at the non-engaging position. The driven-side rotating body 58 does not engage with the roller members 53 in the rotational direction and the rotary shaft 20 is uncoupled from the worm shaft 32. Accordingly, with rotation of the worm shaft 32, the driven-side rotating body 58 idles relative to the driving-side rotating body 71 and the holding case 54. Thus, since the rotary shaft 20 as a rotational load from the side of the output shaft 35 is separated from the worm shaft 32, rotation from the side of the output shaft 35 becomes easy. Therefore, the manual operation of opening/closing the slide door 3 can be easily performed without requiring a large operating force.

When an instruction to automatically open or close the slide door 3 is made, the controller 25 drives the motor main unit 12 to rotatingly drive the rotary shaft 20, and rotational driving of the driving-side rotating body 71 coupled to the rotary shaft 20 is started (refer to FIG. 1). At the start of rotational driving of the driving-side rotating body 71, the first drive plate 81 and the second drive plate 82 rotate substantially integrally (without rotating relative to each other). The roller members 53 having the power transmitting portions 53a held in the control grooves 82d of the driving-side rotating body 71 also rotate together with the driving-side rotating body 71 about the central axis of the driving-side rotating body 71. On the other hand, since the holding case 54 holds the guiding members 55 that function as weights, at the start of rotational driving of the driving-side rotating body 71, the rotational position of the holding case 54 is maintained by the inertial force. The holding case 54 coupled to the driving-side rotating body 71 via the case holding springs 52 starts to rotate with a delay from rotation of the driving-side rotating body 71. As a result, as shown in FIG. 10B, at start of rotational driving, the driving-side rotating body 71 rotates relative to the holding case 54 against the biasing force of the case holding springs 52 while contracting the case holding springs 52 between the driving-side rotating body 71 and the engaging projections 54b. A difference between the driving-side rotating body 71 and the holding case 54 in rotational angle occurs. As a result, since the cam engaging portions 53b rotates relative to the cam grooves 91 in the circumferential direction of the holding case 54, the cam engaging portions 53b are moved from the first guiding portion P1 toward the second guiding portion P2 located forward in the rotational direction of the driving-side rotating body 71 while being guided by the cam grooves 91. In this embodiment, due to the relative rotation between the driving-side rotating body 71 and the holding case 54, the cam engaging portions 53b are relatively moved in the cam grooves 91 to a forward end in the rotational direction of the driving-side rotating body 71. While being guided by the cam grooves 91, the roller members 53 are moved to the radially outward engaging position. At start of rotational driving of the driving-side rotating body 71, the holding case 54 is maintained at the rotational position by the inertial force. For this reason, no centrifugal force is applied to the guiding members 55 held by the holding case 54. Therefore, when the cam engaging portions 53b relatively move from the first guiding portion P1 to the second guiding portion P2 at start of rotational driving of the driving-side rotating body 71, the guiding members 55 are arranged radially innermost in the radial movement range.

Furthermore, with rotation of the driving-side rotating body 71, radially outward ends of the power transmitting portions 53a of the roller members 53 arranged at the engaging position come into contact with the transmitting surfaces 58f located forward in the rotational direction of the driving-side rotating body 71 in the control recesses 58e. At this time, the contact surface 53d located forward in the rotational direction of the driving-side rotating body 71 of the pair of contact surfaces 53d of each of the power transmitting portion 53a is in surface contact with the transmitting surface 58f located forward in the rotational direction of the driving-side rotating body 71. Thereby, the clutch 70 is turned on. When the clutch 70 is turned on, the rotational driving force of the rotary shaft 20 is transmitted to the first drive plate 81, the return springs 83, the second drive plate 82 and the roller members 53 in this order, and further, can be transmitted to the driven-side rotating body 58 through the power transmitting portions 53a of the roller members 53.

As rotational speed of the driving-side rotating body 71 increases, the inertial force applied to the holding case 54, which holds the guiding members 55, becomes smaller. As the inertial force applied to the holding case 54 becomes smaller, the holding case 54 rotates relative to the driving-side rotating body 71 in the same direction as the rotational direction of the driving-side rotating body 71 by the biasing force of the case holding springs 52. As shown in FIG. 10C, with rotation of the holding case 54 relative to the driving-side rotating body 71, the cam grooves 91 of the guiding members 55 held by the holding case 54 are rotated relative to the cam engaging portions 53b in the circumferential direction of the holding case 54, and therefore, the cam engaging portions 53b are relatively moved from the second guiding portion P2 to the first guiding portion P1. However, since the centrifugal force applied to the guiding members 55 gradually increases as the rotational speed of the holding case 54 increases, the guiding members 55 are moved radially outward against the biasing force of the holding springs 56 (refer to FIG. 8) while being guided by the holding recesses 54c. Accordingly, since the radial position of the cam engaging portions 53b is maintained without shifting radially inward, the roller members 53 are held at the engaging position by the guiding members 55.

The third arc portions 91c (second guiding portion P2) of the cam grooves 91 are each shaped like an arc having the center O of the clutch 70 as the center of curvature. For this reason, when the guiding members 55 start to rotate relative to the roller members 53 while being moved radially outward by the centrifugal force, a force having a radially inward component is difficult to be applied from the guiding members 55 to the cam engaging portions 53b. Thus, it is easy to maintain the roller members 53 at the non-engaging position.

When the rotational speed of the driving-side rotating body 71 becomes constant and the inertial force applied to the holding case 54 disappears, the driving-side rotating body 71 and the holding case 54 are held at the neutral position by the biasing force of the case holding springs 52. Furthermore, when the rotational speed of the driving-side rotating body 71 becomes constant, the guiding members 55 are arranged radially outermost in the movement range of the guiding members 55 by the centrifugal force, and the cam engaging portions 53b of the roller members 53 arranged at the engaging position are located at the first guiding portions P1 of the cam grooves 91, respectively. Further, the roller members 53 are also prevented from moving from the engaging position to the radially inward non-engaging position by the centrifugal force applied to the guiding members 55. The rotational driving force of the rotary shaft 20 is transmitted from the driving-side rotating body 71 to the driven-side rotating body 58 through the power transmitting portions 53a of the roller members 53. Therefore, the driven-side rotating body 58 and the worm shaft 32 are rotated integrally, and the rotational force reduced by the worm portion 32a and the worm wheel 33 is output from the output shaft 35.

As shown in FIG. 10O, when load applied to the driven-side rotating body 58 is not more than the biasing force of the return springs 83, the first drive plate 81 and the second drive plate 82 rotate integrally. That is, the relative rotational position between the first drive plate 81 and the second drive plate 82 is maintained so that the circumferential position of the three auxiliary grooves 81b match with that of the three control grooves 82d. Accordingly, the rotational driving force of the rotary shaft 20 is transmitted to the first drive plate 81, the return springs 83, the second drive plate 82, the roller members 53 and the driven-side rotating body 58 in this order. As a result, since the driven-side rotating body 58 rotates, the worm shaft 32 coupled to the driven-side rotating body 58 rotates. The rotational force reduced by the worm portion 32a and the worm wheel 33 is output from the output shaft 35, thereby automatically opening or closing the slide door 3.

As shown in FIG. 10D, when the load applied to the driven-side rotating body 58 is larger than the biasing force of the return springs 83, the first drive plate 81 is rotated relative to the second drive plate 82 in the same direction as the rotational direction of the second drive plate 82 against the biasing force of the return springs 83 while contracting the return springs 83. Of the pair of wedge-shaped surfaces 81c of each of the auxiliary grooves 81b, the wedge-shaped surfaces 81c located rearward in the rotational direction of the first drive plate 81 comes into contact with a radially inward end of the power transmitting portion 53a in the rotational direction. The distance between the transmitting surface 58f in contact with the power transmitting portion 53a and the wedge-shaped surface 81c in contact with the power transmitting portion 53a becomes larger in the circumferential direction toward the radial outer end. That is, the transmitting surface 58f and the wedge-shaped surface 81c that pinch the power transmitting portion 53a therebetween expand toward the radially outward engaging position of the clutch 70. For this reason, the power transmitting portion 53a pinched between the transmitting surface 58f and the wedge-shaped surface 81c is prevented from moving radially inward and is arranged at the engaging position. At this time, of the pair of restricting surfaces 81d of each of the auxiliary grooves 81b, the restricting surface 81d located rearward in the rotational direction of the first drive plate 81 comes into contact with the guiding surface 53c of the power transmitting portion 53a in the rotational direction. A force to push the power transmitting portion 53a radially outward along the wedge-shaped surface 81c is applied to the power transmitting portion 53a pinched between the wedge-shaped surface 81c and the transmitting surface 58f. The restricting surfaces 81d adjacent to the wedge-shaped surfaces 81c in contact with the power transmitting portions 53a come into contact with the power transmitting portion 53a from the rear side in the rotational direction of the first drive plate 81, thereby preventing the power transmitting portions 53a from excessively protruding radially outward due centrifugal force and the like. In the state where the power transmitting portion 53a is pinched between the transmitting surfaces 58f and the wedge-shaped surfaces 81c, the rotational driving force of the rotary shaft 20 is transmitted from the first drive plate 81 to the driven-side rotating body 58 through the roller members 53.

When the motor main unit 12 is stopped, the rotational speed of the rotary shaft 20 lowers. When the motor main unit 12 is stopped, if the load applied to the driven-side rotating body 58 is larger than the biasing force of the return springs 83, the return springs 83 biasing the return projections 81e allows the first drive plate 81 to rotate in the direction opposite to the last rotational direction. Thereby, since the first drive plate 81 is rotated relative to the second drive plate 82, the relative rotational position between the first drive plate 81 and the second drive plate 82 is returned to the position where the circumferential position of the three auxiliary grooves 81b matches with that of the three control grooves 82d. At the same time, pinching of the power transmitting portions 53a between the transmitting surfaces 58f and the wedge-shaped surfaces 81c is cancelled.

Further, when the rotational speed of the driving-side rotating body 71 lowers, the rotational speed of the holding case 54 and the driven-side rotating body 58, which are rotated by the rotational driving force transmitted from the driving-side rotating body 71, also becomes low. As a result, since the centrifugal force applied to the guiding members 55 becomes smaller, the guiding members 55 are moved radially inward by the biasing force of the holding springs 56 (refer to FIG. 8). The roller members 53 each having the cam engaging portion 53b inserted into the cam groove 91 of the guiding member 55 are moved radially inward together with the guiding members 55. At this time, each of the cam engaging portions 53b is located at the first guiding portion P1 in the cam groove 91. Therefore, the roller members 53 are moved from the engaging position to the non-engaging position. As a result, engagement between the driving-side rotating body 71 and the driven-side rotating body 58 in the rotational direction is cancelled, thereby uncoupling the rotary shaft 20 from the worm shaft 32.

FIGS. 10B to 10D show the clutch 70 in a case where the driving-side rotating body 71 (rotary shaft 20) is rotated clockwise. However, also in the case where the rotary shaft 20 is rotated counterclockwise in FIGS. 10B to 10D, the clutch 70 couples the rotary shaft 20 to the worm shaft 32 in the same manner.

As described above, the second embodiment has following advantages in addition to the advantages (1) to (11) of the first embodiment.

(12) During rotational driving of the first drive plate 81, the roller members 53 are moved to the radially outward engaging position and are pinched between the wedge-shaped surfaces 81c of the first drive plate 81 and the transmitting surfaces 58f of the driven-side rotating body 58. At this time, the force to push the roller members 53 radially outward by the wedge-shaped surfaces 81c and the transmitting surfaces 58f is applied to the roller members 53. Therefore, since the state where the driving-side rotating body 71 engages with the driven-side rotating body 58 in the rotational direction is maintained more stably, during rotation of the rotary shaft 20, the ON state of the clutch 70 is stably maintained.

(13) The restricting surfaces 81d prevent the roller members 53 from excessively moving radially outward. For this reason, it is possible to prevent the roller members 53 from pressing the side wall portion 58c of the driven-side rotating body 58 radially outward. Therefore, since the radial thickness of the side wall portion 58c of the driven-side rotating body 58 can be reduced, the clutch 70 can be miniaturized in the radial direction.

(14) When the clutch 70 is turned off with stopping of rotational driving of the rotary shaft 20, even if a torque is required to rotate the first drive plate 81 relative to the second drive plate 82, that is, to rotate the rotary shaft 20, the first drive plate 81 can be rotated by the biasing force of the return springs 83. Therefore, since the reliability in cancellation of pinching of the roller members 53 (power transmitting portions 53a) between the wedge-shaped surfaces 81c and the transmitting surfaces 58f is improved, it avoids the wedge-shaped surfaces 81c from preventing movement of the roller members 53 from the engaging position to the non-engaging position. Thus, reliability of the operation of turning off the clutch 70 is improved.

(15) The third arc portions 91c that locate the roller members 53 at the engaging position at start of rotational driving of the driving-side rotating body 71 are each shaped like an arc having the center O of the clutch 70 as the center of curvature (that is, having the center of curvature on the central axis of the driving-side rotating body 71). For this reason, as compared to the linear cam groove, the cam groove 91 has a longitudinal direction where the roller member 53 is arranged at the engaging position. Therefore, after the roller members 53 are arranged at the engaging position while being guided by the cam grooves 91 at start of rotational driving of the driving-side rotating body 71, the roller members 53 are prevented from moving toward the non-engaging position through the cam grooves 91.

Each embodiment of the present invention may be modified as follows.

In each of the above-described embodiments, the present invention has been described using the slide door opening/ closing device 1 for automatically opening/closing the slide door 3 that opens/closes the gate 2a provided at the side portion of the vehicle body 2 as an example. However, the present invention may be applied to devices that open/close a door other than the slide door 3 as long as they are door opening/closing devices for automatically opening/closing the door by using the motor 11 as the drive source. For example, the present invention may be applied to a back door opening/closing device for automatically opening/closing a back door that opens/closes an opening provided at the rear of the vehicle by the drive force of the motor 11. Further, the motor 11 in each of the above-described embodiments is not necessarily used for the door opening/closing devices and may be used for devices that transmit the rotational driving force of the rotary shaft 20 to a load coupled to the output shaft 35 and allow rotation of the output shaft 35 from the side of the load.

In each of the above-described embodiments, the clutch 50 or 70 is provided in the motor 11. However, the clutches 50 and 70 may be used for a device other than the motor 11, which operates to couple and uncouple the coaxially arranged drive shaft and the driven shaft.

In each of the above-described embodiments, at start of rotational driving of the driving-side rotating bodies 51 and 71, the holding case 54 is rotated by the inertial force applied to the holding case 54 with a delay from rotation of the driving-side rotating body 51 and 71, so that the driving-side rotating bodies 51 and 71 rotate relative to the holding case 54. However, the clutches 50, 70 may be provided with a means for rotating the driving-side rotating bodies 51 and 71 relative to the holding case 54 at start of rotational driving of the driving-side rotating bodies 51 and 71 rather than using the inertial force applied to the holding case 54. For example, the clutches 50 and 70 may be provided with a means for generating a frictional force between the holding case 54 and the rotary shaft 20 at start of rotational driving of the driving-side rotating bodies 51 and 71 so that the holding case 54 is rotated by the frictional force with a delay from the driving-side rotating body 51 and 71.

In each of the above-described embodiments, the roller members 53 are moved between the non-engaging position and the engaging position while being guided by the grooved cam grooves 55c. However, the site (cam portion) for guiding movement of the roller member 53 between the non-engaging position and the engaging position in the guiding member 55 is not limited to the grooved cam groove 55c. For example, a cam protruding portion that axially protrudes from the main body 55a of the guiding member 55 and engages with the cam engaging portion 53b of the roller member 53 may guide movement of the roller member 53 between the non-engaging position and the engaging position. Also in this case, a similar advantage to (1) in the first embodiment can be obtained.

In each of the above-described embodiments, the guiding members 55 each are a weight having a mass for generating the inertial force applied to the holding case 54 at start of rotational driving of the driving-side rotating bodies 51 and 71. However, the guiding members 55 do not necessarily need to include the mass for generating the inertial force applied to the holding case 54. In this case, for example, by assigning a mass to the holding case 54 itself or fixing a weight to the holding case 54 separately from the guiding members 55, the inertial force can be applied to the holding case 54 at start of rotational driving of the driving-side rotating bodies 51 and 71.

The shape of the cam grooves 55c and 91 is not limited to the shape in each of the above-described embodiments. The cam groove may have any shape so long as it can guide the roller member 53 from the non-engaging position to the engaging position or from the engaging position to the non-engaging position with relative rotation between the driving-side rotating bodies 51 and 71, and the holding case 54. For example, the cam groove may be shaped like an arc protruding radially inward when viewed from the axial direction. Further, for example, the cam groove may be obtained by omitting the third arc portions 91c from the cam groove 91 in the second embodiment. For example, the cam groove may have the third arc portions 91c on both circumferential sides of the cam groove 55c in the first embodiment.

The return springs 83 in the second embodiment may be springs other than compression coil springs as long as they bias the return projections 81e during stopping of the rotary shaft 20 to rotate the first drive plate 81 relative to the second drive plate 82.

The clutch 70 in the second embodiment does not necessarily need to include the restricting surfaces 81d.

In the clutches 50, 70 in each of the above-described embodiments, the case holding springs 52 may be springs other than compression coil springs as long as they bias the engaging projections 54b so as to keep the driving-side rotating bodies 51 and 71, and the holding case 54 at the predetermined relative rotational position (neutral position).

In each of the above-described embodiments, the holding springs 56 each are formed of a compression coil spring. However, the holding springs 56 each formed of a tension coil spring may bias the guiding members 55 radially inward. In the case of using the holding springs 56 each formed of the tension coil spring, the cover 57 can be omitted. Further, the holding springs 56 each formed of a spring other than the coil spring may bias the guiding members 55 radially inward. Further, a member for biasing the roller members 53 radially inward such as a spring (holding biasing member) may be provided in the clutches 50 and 70, with the holding springs 56 for biasing the guiding members 55 being omitted. Further, the member such as the spring (holding biasing member) may bias both the guiding members 55 and the roller members 53 radially inward. Also in this case, a similar advantage to (3) in the first embodiment can be obtained.

In each of the above-described embodiments, during rotational driving of the driving-side rotating body 51 or 71, the roller members 53 are in surface contact with the driven-side rotating body 58 in the rotational direction. However, the roller members 53 may be in line contact or point contact with the driven-side rotating body 58 in the rotational direction.

In the first embodiment, the roller members 53 are held by the driving-side rotating body 51 so as to be rotatable integrally with the driving-side rotating body 51, while the guiding members 55 each having the cam groove 55c are held by the holding case 54 so as to be rotatable integrally with the holding case 54. However, the clutch 50 may be configured so that the guiding members 55 are held by the driving-side rotating body 51 so as to be rotatable integrally with the driving-side rotating body 51, while the roller members 53 are held by the holding case 54 so as to be rotatable integrally with the holding case 54. In this case, a mass is assigned to the holding case 54 or a weight is fixed to the holding case 54 so as to apply the inertial force to the holding case 54 at start of rotational driving of the driving-side rotating body 51. Further, the driving-side rotating body 51 allows radial movement of the guiding members 55 relative to the driving-side rotating body, and the holding case 54 allows radial movement of the roller members 53 relative to the holding case 54. Also in this case, a similar advantage to (1) in the first embodiment can be obtained.

In the clutch 50 in the first embodiment, the number of the roller members 53, the control grooves 51e, the control recesses 58e, the case holding springs 52, the guiding members 55 each having the cam groove 55c and the holding springs 56 may be changed as appropriate. The number of these portions provided in the clutch 50 is at least one. Further, as in the clutch 70 in the second embodiment, the number of the auxiliary grooves 81b, the control grooves 82d, the control recesses 58e, the case holding springs 52, the guiding members 55 each having the cam groove 91 and the holding springs 56 may be changed as appropriate. The number of these portions provided in the clutch 70 is at least one.

In the first embodiment, the driving-side rotating body 51 is formed separately from the rotary shaft 20, but the driving-side rotating body 51 may be formed integrally with the rotary shaft 20. Similarly, in the second embodiment, the first drive plate 81 may be formed integrally with the rotary shaft 20. Furthermore, in each of the above-described embodiments, the driven-side rotating body 58 may be formed integrally with the worm shaft 32.

FIG. 1
25 controller
FIG. 2
1 opening direction
2 closing direction
FIG. 5B
1 Rotational direction of driving-side rotating body
FIG. 6
1 Radial movement of roller member
2 Engaging position
3 Non-engaging position
4 Driving of motor main unit
5 Total movement of roller member
6 Movement of roller member by centrifugal force
7 Movement of roller member along cam groove
8 Engageable with driven-side rotating body in rotational direction
9 Stopping of motor main unit
10 Time

The invention claimed is:

1. A clutch for provision between a drive shaft and a driven shaft to operate to couple the drive shaft to the driven shaft when a drive force is transmitted from the drive shaft and uncouple the driven shaft from the drive shaft during non-driving of the drive shaft, the clutch comprising:
    a driving-side rotating body capable of rotating integrally with the drive shaft;
    a driven-side rotating body capable of rotating integrally with the driven shaft;
    a holding case capable of rotating relative to the driving-side rotating body;
    a power transmitting member that is held by one of the driving-side rotating body and the holding case so as to be rotatable integrally with the one of the driving-side rotating body and the holding case, the power transmitting member being arranged between the driving-side rotating body and the driven-side rotating body in the radial direction and being moved between a non-engaging position, where the driving-side rotating body does not engage with the driven-side rotating body in a rotational direction, and an engaging position located radially outward from the non-engaging position, where the driving-side rotating body engages with the driven-side rotating body in the rotational direction; and
    a guiding member having a cam portion that is engaged with the power transmitting member and guides movement of the power transmitting member between the engaging position and the non-engaging position, the guiding member being held by the other of the driving-side rotating body and the holding case so as to be rotatable integrally with the other of the driving-side rotating body and the holding case, wherein
    at start of rotational driving of the driving-side rotating body, relative rotation between the driving-side rotating body and the holding case occurs, resulting in that the power transmitting member is guided by the cam portion to move from the non-engaging position to the engaging position; wherein the guiding member is held so as to be rotatable integrally with the holding case, and
    after the power transmitting member is moved to the engaging position while being guided by the cam portion during rotational driving of the driving-side rotating body, the guiding member is moved radially outward by a centrifugal force, thereby holding the power transmitting member at the engaging position.

2. The clutch according to claim 1, further comprising a holding biasing member for biasing at least either of the guiding member or the power transmitting member radially inward.

3. The clutch according to claim 1, further comprising a case holding biasing member arranged between the driving-side rotating body and the holding case, wherein
    the case holding biasing member biases the holding case such that the driving-side rotating body and the holding case are held at a relative rotational position that locates the power transmitting member at the non-engaging position.

4. The clutch according to claim 1, wherein
    the guiding member is held so as to be rotatable integrally with the holding case,
    the driving-side rotating body includes a first rotating body and a second rotating body, the first rotating body being provided so as to be rotatable integrally with the drive shaft and having a wedge-shaped surface capable of contacting the power transmitting member in the rotational direction, and the second rotating body being provided so as to be rotatable relative to the first rotating body, holding the power transmitting member and rotating integrally with the power transmitting member,
    the driven-side rotating body includes a transmitting surface for pinching the power transmitting member between the transmitting surface body and the wedge-shaped surface, and
    when the wedge-shaped surface and the transmitting surface pinch the power transmitting member arranged at the engaging position, the wedge-shaped surface and the transmitting surface expand toward the radially outward engaging position.

5. The clutch according to claim 4, wherein
    the first rotating body includes a restricting surface, and when the wedge-shaped surface and the transmitting surface pinch the power transmitting member arranged at the engaging position, the restricting surface contacts the power transmitting member in the rotational direction to prevent the power transmitting member from moving radially outward by an excessive amount.

6. The clutch according to claim 4 further comprising a return biasing member arranged between the first rotating body and the second rotating body, wherein
    when rotational driving of the first rotating body is stopped, the return biasing member biases the first rotating body so as to rotate the first rotating body in a direction opposite to the last rotational direction relative to the second rotating body to cancel pinching of the power transmitting member by the wedge-shaped surface and the transmitting surface.

7. The clutch according to claim 1, wherein the cam portion has a circumferential end provided with an engagement guiding portion that locates the power transmitting member at the engaging position by relative rotation between the driving-side rotating body and the holding case at start of rotational driving of the driving-side rotating body, and the engagement guiding portion is shaped like an arc having the center of curvature on a central axis of the driving-side rotating body.

8. The clutch according to claim 1, wherein the cam portion is a cam groove into which the power transmitting member is inserted.

9. The clutch according to claim 1, wherein at start of rotational driving of the driving-side rotating body, the holding case is rotated by the inertial force applied to the holding case with a delay from rotation of the driving-side rotating body, so that the driving-side rotating body rotates relative to the holding case.

10. The clutch according to claim 1, wherein the guiding member is a weight having a mass for generating the inertial force applied to the holding case at start of rotational driving of the driving-side rotating body.

11. A motor comprising:

a motor main unit including the drive shaft;

a decelerating mechanism including the driven shaft coaxially arranged with the drive shaft, the decelerating mechanism reducing a rotational driving force of the drive shaft and outputting the reduced force; and the clutch according to claim 1 arranged between the drive shaft and the driven shaft.

12. A vehicle door access device that uses the motor according to claim 11 as a drive source and is configured to open and close a door that opens and closes an opening provided on a vehicle by a drive force of the motor, the vehicle door access device, in response to an instruction to automatically open or close the door, the device drives the motor main unit and couples the drive shaft to the driven shaft by means of the clutch to automatically open or close the door, and during stopping of the motor main unit, the device uncouples the driven shaft from the drive shaft by means of the clutch to reduce an operating load at manual opening or closing of the door.

* * * * *